United States Patent
Nakamura et al.

(10) Patent No.: US 8,407,431 B2
(45) Date of Patent: *Mar. 26, 2013

(54) COMPUTER SYSTEM PREVENTING STORAGE OF DUPLICATE FILES

(75) Inventors: Yasuaki Nakamura, Fujisawa (JP); Hideo Tabuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,959

(22) Filed: Apr. 3, 2012

(65) Prior Publication Data

US 2012/0191928 A1    Jul. 26, 2012

Related U.S. Application Data

(63) Continuation of application No. 13/037,766, filed on Mar. 1, 2011, now Pat. No. 8,151,066, which is a continuation of application No. 11/972,659, filed on Jan. 11, 2008, now Pat. No. 7,900,000.

(30) Foreign Application Priority Data

Mar. 27, 2007  (JP) ................. 2007-082052

(51) Int. Cl.
*G06F 12/00* (2006.01)
(52) U.S. Cl. ................. 711/156; 711/162; 711/E12.001; 711/E12.103
(58) Field of Classification Search .................. 711/156, 711/E12.103, 162, E12.001
See application file for complete search history.

(56) References Cited

U.S. PATENT DOCUMENTS

| 6,389,433 | B1 | 5/2002 | Bolosky et al. |
| 6,477,544 | B1 | 11/2002 | Bolosky et al. |
| 2003/0105716 | A1 | 6/2003 | Sutton, Jr. et al. |
| 2005/0125411 | A1 | 6/2005 | Kilian et al. |
| 2005/0144172 | A1 | 6/2005 | Kilian et al. |
| 2006/0064441 | A1 | 3/2006 | Yamamoto |
| 2006/0242363 | A1 | 10/2006 | Tamura et al. |
| 2007/0043757 | A1 | 2/2007 | Benton et al. |
| 2007/0050423 | A1 | 3/2007 | Whalen et al. |

FOREIGN PATENT DOCUMENTS

| JP | 2003-524243 | 8/2003 |
| JP | 2005-107645 | 4/2005 |
| JP | 2005-174339 | 6/2005 |
| JP | 2005-235171 | 9/2005 |
| WO | WO 99/09480 | 2/1999 |
| WO | WO 01/61563 | 8/2001 |

*Primary Examiner* — Yong Choe
(74) *Attorney, Agent, or Firm* — Antonelli, Terry, Stout & Kraus, LLP.

(57) ABSTRACT

A storage arrangement including: a first storage system having one or more first logical storage devices and a second storage system having one or more second logical storage devices, configured to: a) determine whether two or more identical contents hash values are contained in a plurality of contents hash values of said plurality of files; and b) change an access destination of a first file corresponding to a first contents hash value from among said two or more identical contents hash values, to a position of a second file corresponding to a second contents hash value if there are said two or more identical contents hash values, c) do not migrate said first file to said second storage system, and migrate said second file to said second storage system to store in any of said one or more second logical storage devices.

12 Claims, 20 Drawing Sheets

FIG. 2A

- PROGRAM OF MIGRATION EXECUTION — 701
- PROGRAM OF DETERMINATION CONTROL — 705
- PROGRAM OF ACCESS CONTROL — 707
- PROGRAM OF TABLE PROVISION — 709

FIG. 2B

801 ADDRESS MAP MANAGEMENT TABLE

| LDEV NUMBER (VDEV NUMBER) 8011 | WWN 8012 | LUN 8013 |
|---|---|---|
| 01 | WWN1 | 0 |
| ... | ... | ... |

FIG. 2C

803 LDEV MANAGEMENT TABLE

| PORT NUMBER 8031 | LUN 8032 | LDEV NUMBER 8033 | ACCESS ATTRIBUTION 8034 | LDEV TYPE 8035 | USAGE STATE 8036 |
|---|---|---|---|---|---|
| 01 | 01 | 01 | READ/WRITE | R | IN USE |
| 02 | 02 | 02 | READ/WRITE | R | IN USE |
| 03 | 03 | 03 | READ ONLY | V | NOT USED |
| 04 | 04 | 04 | READ ONLY | V | NOT USED |
| ... | ... | ... | ... | ... | ... |

FIG. 5

| i NODE NUMBER | i NODE INFORMATION |
|---|---|
| 2 | "/" OWNER, FILE SIZE, ADDRESS 0 |
| 10 | "/usr" OWNER, FILE SIZE, ADDRESS 1 |
| 100 | "/usr/dir1" OWNER, FILE SIZE, ADDRESS 2 |
| 101 | "/usr/dir1/file1.txt" OWNER, FILE SIZE, ADDRESS 3 |
| ... | ... |

811

| ADDRESS | CONTENTS |
|---|---|
| 0 | usr,10,bin,20,etc,30 |
| 1 | dir1,100,dir2,200,... |
| 2 | file1.txt,101 |
| 3 | FILE DATA |
| ... | ... |

| Disk Group Name | Device file | File system | Port NUMBER | Lun NUMBER | LDEV NUMBER |
|---|---|---|---|---|---|
| /dev/vx/dsk/dg00 | /dev/rdsk/c0t1d0 | / | 1 | 0 | 00:00 |
|  | /dev/rdsk/c0t1d1 | /usr | 1 | 1 | 00:01 |
| /dev/vx/dsk/dg03 | /dev/rdsk/c0t1d2 | /bin | 1 | 2 | 00:02 |
| /dev/vx/dsk/dg06 | /dev/rdsk/c0t1d3 | /etc | 1 | 3 | 00:03 |

835 CONTENTS IDENTIFIER MANAGEMENT TABLE

| HASH VALUE | ADDRESS | FILE NAME | FILE ADDRESS | STORAGE PERIOD LIMIT |
|---|---|---|---|---|
| 11EA947698A99EF87446D74F60DFF821 | 5,6,7 | file1.txt | /user/dir1/ | 2020.01.01 |
| BC1F42AE6EAF637580A0A6EEA9BCBDBB | 10,11,12 | file2.txt | /user/dir1/ | 2010.01.01 |
| ... | ... | ... | ... | ... |

8351, 8352, 8353, 8354, 8355

861 EXTENT MANAGEMENT TABLE

| ID | ADDRESS | ACCESS ATTRIBUTION | STORAGE PERIOD LIMIT | CHANGE FLAG | ExtID | VDEV NUMBER |
|---|---|---|---|---|---|---|
| 0 | 5,6,7 | Read Only | 2020.01.01 | Off | - | - |
| 1 | 10,12,14 | Read Only | 2010.01.01 | Off | - | - |
| ... | ... | ... | ... | ... | ... | ... |

| HASH VALUE | |
|---|---|
| 11EA947698A99EF87446D74F60DFF821 | |
| 11EA947698A99EF87446D74F60DFF821 | |
| ... | ... |

| ID | ADDRESS | ACCESS ATTRIBUTION | STORAGE PERIOD LIMIT | CHANGE FLAG | ExtID | VDEV NUMBER |
|---|---|---|---|---|---|---|
| 0 | 5,6,7 | Read Only | 2020.01.01 | Off | - | - |
| 1 | 10,12,14 | Read Only | 2010.01.01 | On | 0 | - |
| ... | ... | ... | ... | ... | ... | ... |

8351 FIRST CONTENTS IDENTIFIER MANAGEMENT TABLE

| HASH VALUE |
|---|
| 11EA947698A99EF87446D74F60DFF821 |
| BC1F42AE6EAF637580A0A6EEA9BCBDBB |
|  |

8351 SECOND CONTENTS IDENTIFIER MANAGEMENT TABLE

| HASH VALUE |
|---|
| 11EA947698A99EF87446D74F60DFF821 |
| ... |

FIG. 15B

FIRST EXTENT MANAGEMENT TABLE

| 8611 | 8612 | 8613 | 8614 | 8615 | 8616 | 8617 |
|---|---|---|---|---|---|---|
| ID | ADDRESS | ACCESS ATTRIBUTION | STORAGE PERIOD LIMIT | CHANGE FLAG | ExtID | VDEV NUMBER |
| 0 | 5,6,7 | Read Only | 2020.01.01 | Off | - | - |
| ... | ... | ... | ... | ... | ... | ... |

SECOND EXTENT MANAGEMENT TABLE

| 8611 | 8612 | 8613 | 8614 | 8615 | 8616 | 8617 |
|---|---|---|---|---|---|---|
| ID | ADDRESS | ACCESS ATTRIBUTION | STORAGE PERIOD LIMIT | CHANGE FLAG | ExtID | VDEV NUMBER |
| 10 | 20,21,22 | Read Only | 2010.01.01 | On | 0 | 01 |
| ... | ... | ... | ... | ... | ... | ... |

| 8011 | 8012 | 8013 |
|---|---|---|
| LDEV NUMBER (VDEV NUMBER) | WWN | LUN |
| 01 | WWN1 | 0 |
| ... | ... | ... |

MIGRATION

| PORT NUMBER 8031 | LUN 8032 | LDEV NUMBER 8033 | ACCESS ATTRIBUTION 8034 | LDEV TYPE 8035 | USAGE STATE 8036 |
|---|---|---|---|---|---|
| 01 | 01 | 01 | READ ONLY | R | IN USE |
| 02 | 02 | 02 | READ ONLY | R | IN USE |
| 03 | 03 | 03 | READ/WRITE | V | NOT USED |
| 04 | 04 | 04 | READ/WRITE | V | NOT USED |
| ... | ... | ... | ... | ... | ... |

| PORT NUMBER 8031 | LUN 8032 | LDEV NUMBER 8033 | ACCESS ATTRIBUTION 8034 | LDEV TYPE 8035 | USAGE STATE 8036 |
|---|---|---|---|---|---|
| 01 | 01 | 01 | READ ONLY | R | IN USE |
| 02 | 02 | 02 | READ ONLY | R | IN USE |
| 03 | 03 | 03 | READ/WRITE | V | IN USE |
| 04 | 04 | 04 | READ/WRITE | V | IN USE |
| ... | ... | ... | ... | ... | ... |

| LDEV NUMBER (VDEV NUMBER) 8011 | WWN 8012 | LUN 8013 |
|---|---|---|
| 03 | WWN1 | 0 |
| 04 | WWN2 | 1 |
| ... | ... | ... |

FIG. 18A

| DIRECTORY DEVICE LIST | | | | |
|---|---|---|---|---|
| File system directory | Device file | Port # | Lun # | Ldev # |
| / | /dev/rdsk/c0t1d0 | 1 | 0 | 00:00 |
| /usr | /dev/rdsk/c0t1d1 | 1 | 1 | 00:01 |
| /bin | /dev/rdsk/c0t1d2 | 1 | 2 | 00:02 |
| /etc | /dev/rdsk/c0t1d3 | 1 | 3 | 00:03 |

| FILE INFORMATION LIST | | DIRECTORY: /usr | |
|---|---|---|---|
| FILE ADDRESS | FILE NAME | STORAGE PERIOD | ACCESS ATTRIBUTION |
| /usr/dir1/ | file 1.txt | yyyy.mm.dd | Read/Write |
| | file 2.txt | yyyy.mm.dd | Read/Write |
| | | | |

FIG. 18B

| DIRECTORY DEVICE LIST | | | | |
|---|---|---|---|---|
| File system directory | Device file | Port # | Lun # | Ldev # |
| / | /dev/rdsk/c0t1d0 | 1 | 0 | 00:00 |
| /usr | /dev/rdsk/c0t1d1 | 1 | 1 | 00:01 |
| /bin | /dev/rdsk/c0t1d2 | 1 | 2 | 00:02 |
| /etc | /dev/rdsk/c0t1d3 | 1 | 3 | 00:03 |

| FILE INFORMATION LIST | | DIRECTORY: /usr | |
|---|---|---|---|
| FILE ADDRESS | FILE NAME | STORAGE PERIOD | ACCESS ATTRIBUTION |
| /usr/dir1/ | file 1.txt | yyyy.mm.dd | Read Only |
| | file 2.txt | yyyy.mm.dd | Read/Write |
| | | | |

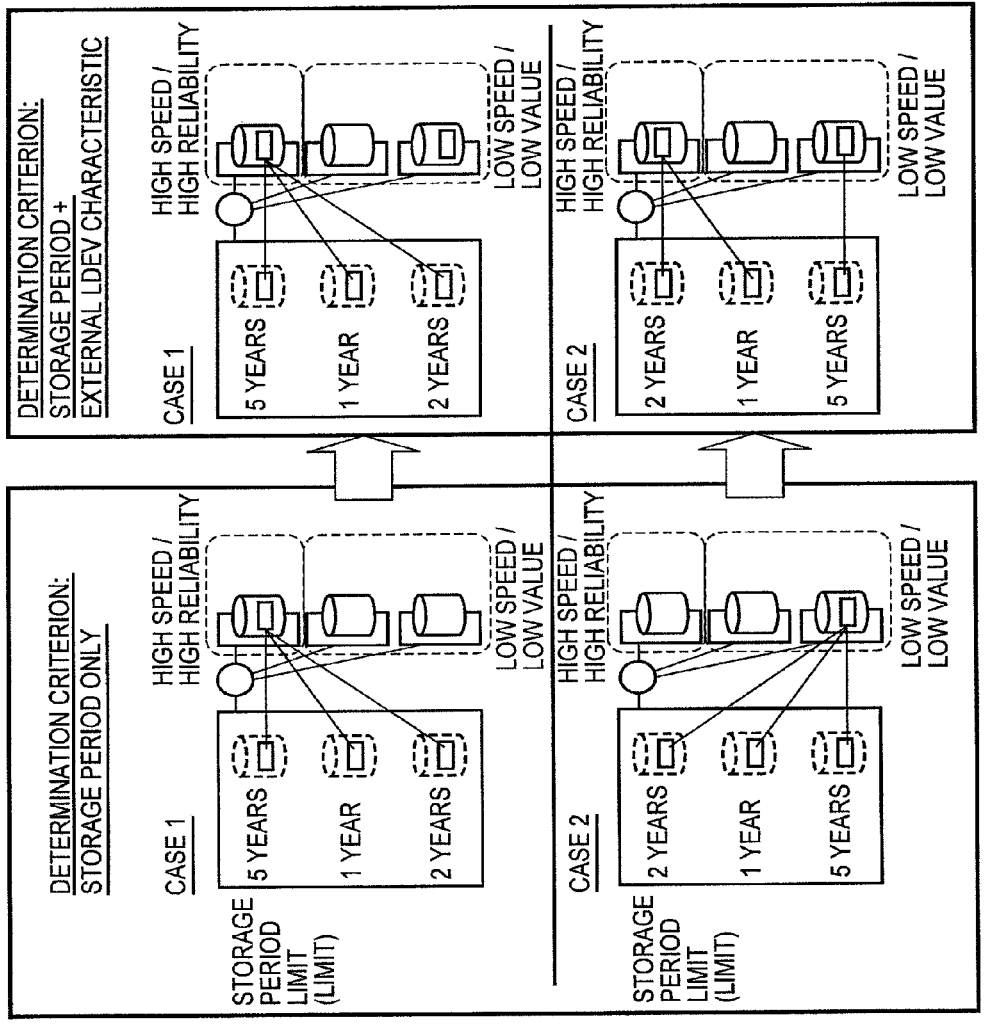

FIG. 20

801' ADDRESS MAP MANAGEMENT TABLE

| LDEV NUMBER (VDEV NUMBER) | WWN | LUN | EXTERNAL LDEV CHARACTERISTIC |
|---|---|---|---|
| 01 | WWN1 | 0 | HIGH SPEED / HIGH RELIABILITY |
| 02 | WWN2 | 1 | LOW SPEED / LOW VALUE |
| ... | ... | ... | ... |

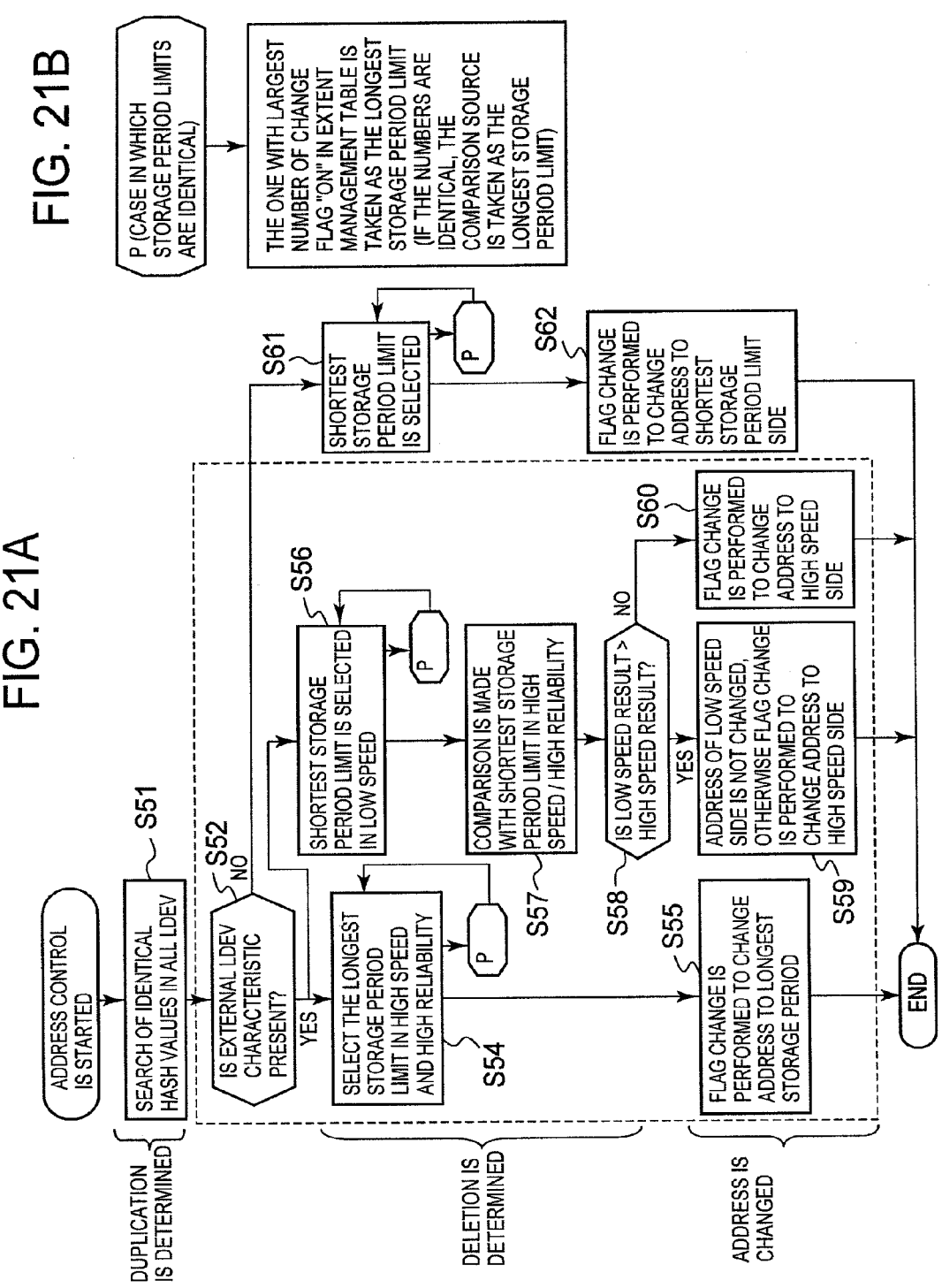

FIG. 22A

| PORT NUMBER 8031 | LUN 8032 | LDEV NUMBER 8033 | ACCESS ATTRIBUTION 8034 | LDEV TYPE 8035 | USAGE STATE 8036 |
|---|---|---|---|---|---|
| 03 | 03 | 03 | READ ONLY | R | NOT USED |
| 04 | 04 | 04 | READ ONLY | R | NOT USED |
| 01 | 01 | 01 | READ/WRITE | V | IN USE |
| 02 | 02 | 02 | READ/WRITE | V | IN USE |
| ... | ... | ... | ... | ... | ... |

FIG. 22B

| LDEV NUMBER (VDEV NUMBER) 8011 | WWN 8012 | LUN 8013 |
|---|---|---|
| 01 | WWN1 | 0 |
| 02 | WWN2 | 1 |
| ... | ... | ... |

COMPUTER SYSTEM PREVENTING STORAGE OF DUPLICATE FILES

CROSS-REFERENCE TO PRIOR APPLICATION

This is a continuation of U.S. application Ser. No. 13/037,766, filed Mar. 1, 2011 now U.S. Pat. No. 8,151,066, which is a continuation of U.S. application Ser. No. 11/972,659, filed Jan. 11, 2008 (now U.S. Pat. No. 7,900,000). This application relates to and claims priority from Japanese Patent Application No. 2007-082052, filed on Mar. 27, 2007. The entirety of the contents and subject matter of all of the above is incorporated herein by reference.

BACKGROUND

The present invention relates to a storage control technology of electronic files.

For example, a NAS (Network Attached Storage) node (for example, a file server) manages the file, and the body of the file is stored in a storage device inside the NAS node or outside the NAS node.

Generally the files with different names are stored in a storage device even if the file contents is the same. In this case, the files with absolutely identical contents (that is, the files with completely duplicate contents) are stored in the storage device. Therefore, the storage capacity is unnecessarily consumed. The technologies disclosed in Japanese Patent Applications Laid-open No. 2005-235171 and 2005-174339 are examples of storage control technologies for preventing the storage of duplicate files. For example, the following is disclosed in Japanese Patent Applications Laid-open No. 2005-235171 and 2005-174339.

There are present a host and a storage device. The host has an application and a special API (Application Program Interface). The storage device communicates with the special API. When the API of the host receives a file storage request from the application, if the association of the file name of the file and the below-described contents address is not managed, the file is transmitted to the storage device, but if the association is managed, the contents address of the file is transmitted to the storage device. When the storage device receives the file from the API of the host, a hash value is generated from the file contents. This hash value is the contents address. The storage device stores the received file, performs management by associating the generated contents address with the physical storage location of the file, and returns the contents address to the API of the host. The API of the host performs management by associating the contents address received from the storage device with the file name of the transmitted file. On the other hand, when the storage device receives the contents address from the API of the host, the storage device acquires the file from the physical storage location associated with the contents address and returns the acquired file to the API of the host.

With the technology disclosed in Japanese Patent Applications Laid-open No. 2005-235171 and 2005-174339, a hash value generated in the storage device is used as a contents address. Therefore, a special API of a high-level device such as a host is necessary to designate the file with the contents address to the storage device.

SUMMARY

It is an object of the present invention to prevent the storage of duplicate files even when a special API is not required for a high-level device.

Other objects of the present invention will become clear from the following description.

A plurality of contents intrinsic values that are values intrinsic to respective contents of a plurality of files stored in one or more first storage devices are calculated. Whether two or more identical contents intrinsic values are contained in said plurality of contents intrinsic values is determined. When two or more identical contents intrinsic values are present, an access destination of a first file corresponding to a first contents intrinsic value from among these two or more contents intrinsic values is changed to a position having stored therein a second file corresponding to a second contents intrinsic value from among these two or more contents intrinsic values.

BRIEF DESCRIPTION OF THE DRAWINGS

FIG. 2A shows an example of a computer program executed by a CPU located inside a controller unit of the primary storage system;

FIG. 2B shows a configuration example of an Address Map Management Table;

FIG. 2C shows a configuration example of an LDEV Management Table;

FIG. 5 shows an example of a Directory File Information Table that is managed by a File System Program of a NAS node;

FIG. 6 shows a table having recorded therein information relating to a logical volume storing a file or a directory and a portion of a LDEV Management Table managed by a primary storage system;

FIG. 7 shows a configuration example of a Contents Identifier Management Table;

FIG. 14A shows that a selected hash value and a matching hash value are present in one Extent Management Table;

FIG. 14B shows an example of update results of the Extent Management Table in the case shown in FIG. 14A;

FIG. 15A shows that a selected hash value and a matching hash value are present in different Extent Management Tables;

FIG. 15B shows an example of update results of the Extent Management Table where the selected hash value is present in the case shown in FIG. 15A;

FIG. 18A shows an example of a GUI before the migration that is displayed by a Program of UI Control;

FIG. 18B shows an example of a GUI after the migration;

FIG. 19A shows an elimination determination criterion in the first embodiment and the results of address change according to this criterion;

FIG. 19B shows an elimination determination criterion in the second embodiment and the results of address change according to this criterion;

FIG. 20 shows a configuration example of an Address Map Management Table in the second embodiment;

FIG. 21 shows an example of address control processing flow in the second embodiment;

FIG. 22A shows an example of LDEV Management Table after the migration in the first embodiment; and FIG. 22B shows an example of an Address Map Management Table after the migration.

DETAILED DESCRIPTION OF THE PREFERRED EMBODIMENTS

Figure 1:
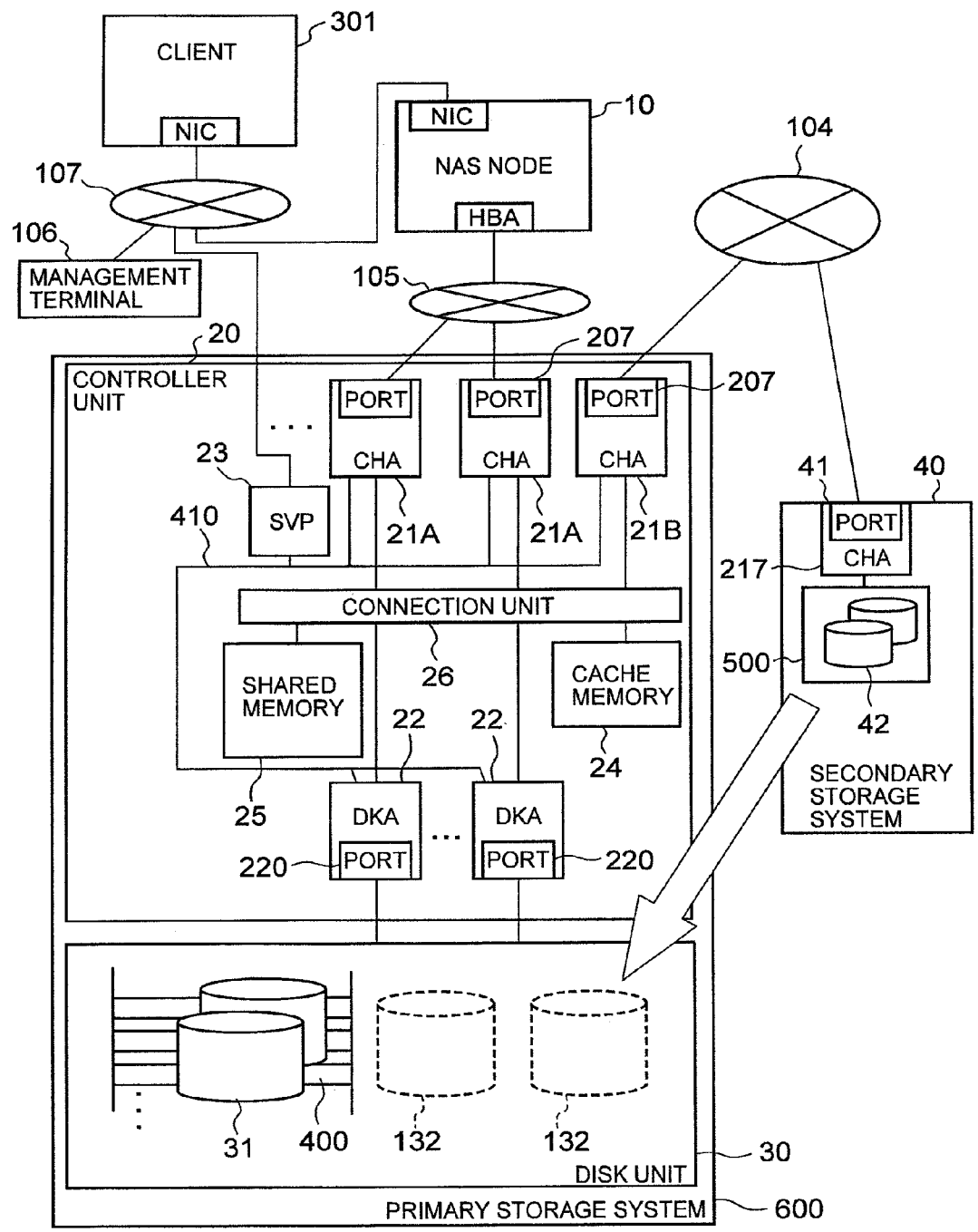
FIG. 1 is a block-diagram illustrating a configuration example of a computer system of the first embodiment of the present invention.

In one embodiment of the present invention, a computer and a first storage system having one or more first logical storage devices where a plurality of files are stored are provided. The computer can comprise an intrinsic value calculation unit that calculates a plurality of contents intrinsic values that are values intrinsic to contents of a plurality of files, an intrinsic value transmission unit that transmits a plurality of contents intrinsic values corresponding respectively to the plurality of files to the first storage system. The first storage system comprises a duplication determination unit that determines whether two or more identical contents intrinsic values are contained in the plurality of contents intrinsic values, and a change control unit that changes an access destination of a first file corresponding to a first contents intrinsic value from among these two or more contents intrinsic values to a position having stored therein a second file corresponding to a second contents intrinsic value from among these two or more contents intrinsic values, when there are the two or more identical contents intrinsic values.

In one embodiment, the intrinsic value calculation unit can calculate a plurality of contents intrinsic values when the plurality of files are taken as archive objects. More specifically, for example, the intrinsic value calculation unit can calculate the contents intrinsic values by using a hash function with respect to a file contents based on information (for example, i-node information) indicating a storage position of a file that is managed by a file system used by a NAS node that transits an access request to the first storage system when the plurality of files are taken as archive objects.

In one embodiment, the intrinsic value calculation unit can prohibit the first storage system from updating one or more first logical storage devices when a plurality of files are taken as archive objects. A plurality of files taken as archive objects can be designated in a variety of units such as file units, directory units, file system units, and first logical storage device units. Further, the "archive object" as referred to herein is a can man an object that cannot be updated. The update of each of one or more first logical storage devices that store a plurality of files that are unupdatable is prohibited.

In one embodiment, there are a plurality of storage period limits that are respectively associated with a plurality of contents intrinsic values. The change control unit changes an access destination of the first file corresponding to the first storage period limit to a position having stored therein the second file corresponding to a second storage period limit that is longer than the first storage period unit, from among two or more storage period limits respectively corresponding to two or more identical contents intrinsic values.

In one embodiment, a second storage system comprising one or more second logical storage devices is connected to the first storage system. The first storage system can further comprise one or more virtual logical storage devices respectively associated with one or more second logical storage devices, and a migration execution unit that writes a body of each file stored in the one or more first logical storage devices to the one or more second logical storage devices via one or more virtual logical storage devices of migration destination. The migration execution unit does not write a body of the first file into any of one or more second logical storage devices and writes a body of the second file into any of one or more second logical storage devices from among two or more files respectively corresponding to two or more identical contents intrinsic values. The change control unit can change an access destination of the first file to a position where a body of the second file has been written.

In one possible embodiment, before the migration is started, none of the one or more first logical storage devices that store the plurality of files can be updated. After the migration is completed, each of the one or more virtual logical storage devices can be updated, but none of the plurality of files that have become the object of the migration can be updated.

In one embodiment, the change control unit can further control the change of access destination based on a device characteristic of one or more second logical storage devices.

In one embodiment, a migration destination of a first file corresponding to the longest storage period limit and a second file that is another file, from among two or more storage period limits respectively corresponding to two or more identical contents intrinsic values, is taken as a first virtual logical storage device corresponding to a first second logical storage device having a device characteristic of a first type (for example, a characteristic of a low speed). A migration destination of a third file with a storage period limit longer than the storage period limit of the second file is taken as a second virtual logical storage device corresponding to a second logical storage device having a device characteristic of a second type (for example, a characteristic of a high speed) that is superior to the device characteristic of the first type. In this case, the change control unit can change an access destination of the second file to a position having stored therein a body of the third file. Further, the migration execution unit can write a body of the first file into the first second logical storage device via the first virtual logical storage device, does not write a body of the second file to the first second logical storage device, and can write a body of the third file into the second logical storage device via the second virtual logical storage device.

In one embodiment, for example, because a failure has occurred in the first second logical storage device, the change control unit can change an access destination of the first file to a position where a position of the third file is stored, when reading of a body of the first file from the first second logical storage device is impossible. Further, for example, because a failure has occurred in the second logical storage device, the change control unit can change an access destination of the third file to a position where a body of the first file is stored when reading of a body of the third file from the second logical storage device is impossible.

In one embodiment, the computer can further comprise a storage area and a completeness check unit. The first storage system can further comprise a storage region that stores a plurality of contents intrinsic values received from the computer. The intrinsic value calculation unit can store a plurality of contents intrinsic values in the storage area of the computer. The completeness check unit can compare a contents intrinsic value from among a plurality of contents intrinsic values that are stored in the storage area of the computer, this contents intrinsic value corresponding to the file selected from a plurality of files, with a contents intrinsic value corresponding to the selected file that has been stored in the storage area of the first storage system.

In one embodiment, the first storage system can further comprise a saved capacity notification unit. The saved capacity notification unit can calculate a storage capacity saved by changing the access destination of the first file and send information indicating this storage capacity to the computer.

In one embodiment, the change control unit can change the access destination by updating a change management table having a plurality of records respectively corresponding to a plurality of files. A field having recorded therein a record ID, position information of the file, and a record ID of a reference destination is present in one record corresponding to one file. The change control unit can update the record ID of the reference destination to a record ID on the second record corresponding to the second file in a first record corresponding to the first file. The record can use a flag indicating whether of not to change. For example, the change control unit can set to On the flag corresponding to the first file for which the address destination will be changed.

In one embodiment, a storage period limit of a file and an access attribution of a file may be further recorded in one record of the change management table. The change control unit can update a reference destination record ID on the second record of the second file corresponding to a second storage period limit that is longer than a first storage period limit, from among two or more storage period limits respectively corresponding to the two or more identical contents intrinsic values, to an ID on the first record of the first file corresponding to the first storage period limit and set an access attribution on the first and second records to Read Only. In this case, even if the first storage system receives a write access that designated a position shown by a position information on the first and second records, writing to this position is not executed.

Any two or more of the above-described multiple embodiments can be combined together. The above-described computer may be a management computer for managing the first storage system. Alternatively, it may be a NAS node for transmitting an access request to the first storage system. Further, various components of the above-described computer may be also provided in the first storage system.

Each of the above-described units (for example, the intrinsic value calculation unit, duplication determination unit, change control unit, etc.) can be implemented of hardware (for example, a circuit), a computer program, or a combination thereof (for example, one or a plurality of CPU that read and execute a computer program). Each computer program can be read from storage resources (for example, a memory) provided in the computer. The programs can be installed via a storage medium such as a CD-ROM or a DVD (Digital Versatile Disk) or downloaded via a communication network such as Internet or LAN into the storage resources.

Several embodiments of the present invention will be described below in greater detail. In the explanation below, the first storage system will be referred to as "primary storage system", and the second storage system will be referred to as "secondary storage system". The elements (for example, memory) located in the primary storage system will be referred to as "internal elements", and the elements in the secondary storage system located outside the primary storage system will be referred to as "external elements". Furthermore, identical elements will be explained by using identical parent numbers, and when identical elements are distinguished, the explanation uses parent numbers and child numbers.

First Embodiment

FIG. 1 is a block diagram illustrating a configuration example of the computer system of the first embodiment of the present invention.

A NAS node 10 and a primary storage system 600 are connected to a first communication network (for example, a SAN (Storage Area Network)) 105. The primary storage system 600 and a secondary storage system 40 are connected to a second communication network 104 (for example, a SAN). The NAS node (for example, a file server) 10, a client 301, the primary storage system 600, and a management terminal 106 are connected to a third communication network (for example, a LAN (Local Area Network)) 107. At least two from among a plurality of communication networks 105, 104, and 107 may be one communication network. The communication networks 105, 104, and 107 can employ various communication networks. At least one from among a plurality of communication networks 105, 104, and 107 may be a special line.

At least one from among the client 301, the NAS node 10, and the management terminal 106 is, for example, a computer device comprising a CPU (Central Processing Unit) and information processing resources such as a memory. For example, the computer device can be configured as a personal computer, a workstation, and a mainframe.

The client 301 can transmit a file access request (file read request or file write request) to the NAS node 10 based on a general protocol (for example, NFS (Network File System) or CIFS (Common Internet File System)) with respect to the NAS node 10.

The NAS node 10 receives the file access request from the client 301, creates a block access request for writing the file body (for example, a plurality of data blocks) corresponding to the received file access request into a logical storage device (sometimes referred to hereinbelow as "LDEV", which is the abbreviation of Logical Device) located inside the primary storage system 600, or reading the file body from the LDEV, and transmits the created block access request. A file management device of a different kind can be also employed instead of the NAS node 10.

The primary storage system 600 can be, for example, a RAID (Redundant Array of Independent (or Inexpensive) Disks) comprising a multiplicity of disks 400 arranged as an array. Such configuration is, however, not limiting, and the primary storage system 600 can be also configured as a storage virtualization device of another kind, for example, as a switch (more specifically, a fiber channel switch of an intelligent type with increased functionality) that constitutes the communication network. Because the primary storage system 600, as will be described below, provides storage resources of the secondary storage system 40 to the NAS node 10, as its own LDEV, the primary system may have no local storage devices that are directly supported by itself.

The primary storage system 600 can be generally classified into a controller unit 20 and a disk unit 30. The controller unit 20 comprises, for example, a channel adapter (referred to hereinbelow as CHA) 21, a disk adapter (referred to hereinbelow as DKA) 22, a SVP (Service Processor) 23, a cache memory 24, a shared memory 25, and a connection unit 26.

The CHA 21 performs data communication with an external device (for example, the NAS node 10 or secondary storage system 40) via a communication port 207. For example, the CHA 21 is configured as a microcomputer system comprising a CPU, a memory, and the like. A network address (for example, WWN (World Wide Name)) for identifying the CHA 21 is allocated to the CHA 21. A CHA 21A that is connected to the NAS node 10 and a CHA 21B that is connected to the secondary storage system 40 are contained in the CHA 21. The CHA 21A and CHA 21B may be integrated.

The DKA 22 has a communication port 220 for connection to a disk (referred to hereinbelow as "internal disk") 400 provided in the disk unit 30 and can communicate with the internal disk 400 via the communication port 220. The DKA 22 is configured as a microcomputer system comprising a CPU, a memory, and the like. The DKA 22 can write the data that were written from the CHA 21A to the cache memory 24 into the internal disk 400 or write the data that were read from the internal disk 400 to the cache memory 24. Furthermore, the DKA 22 can convert a logical address into a physical address when performing data input/output with the internal disk 400.

The cache memory 24 is, for example, a volatile or nonvolatile memory and can temporarily store the data that were received from the NAS node 10 and transferred into an internal LDEV 31 or an external LDEV 42, or the data that were read from the internal LDEV 31 or the external LDEV 42.

The shared memory 25 is, for example, a nonvolatile memory that stores information (for example, control information) relating to the control of the primary storage system 600. Examples of control information include the below described Contents Identifier Management Table, Address Map Management Table, and Extent Management Table.

The connection unit 26 serves to connect the CHA 21, DKA 22, cache memory 24, and shared memory 25 to each other. The connection unit 26 can be configured, for example, as a high-speed bus such as an ultrahigh-speed crossbar switch that performs data transmission by high-speed switching operation.

The disk unit 30 comprises a plurality of internal disks 400 arranged as an array. Disk-type storage devices such as hard disks, flexible disks, and optical disks can be used as the internal disks 400. A variety of other storage devices, for example, magnetic tapes and semiconductor memory (for example, flash memory) can be used instead of the internal disks 400. A logical storage device (internal LDEV) 31 is provided on the storage area of the internal disk 400. The internal LDEV 31 is a real LDEV that was set by using storage resources of the physical internal disk 400, whereas the LDEV 132 is a virtual LDEV, rather than the LDEV that was set by using the internal disk 400. The internal LDEV 31 will be referred to hereinbelow as a real internal LDEV 31, and the LDEV 132 will be referred to as a virtual internal LDEV 132. When an access is generated to the real internal LDEV 31, the access is performed to the internal disk 400, but when access is generated to the virtual internal LDEV 132, the access is performed to the external LDEV 42. The technology of this type is sometimes called the external connection technology, and, for example, each LUN (Logical Unit Number) of the virtual internal LDEV 132 and the external LDEV 42 may be associated at a 1:1 ratio, or a technology disclosed in Japanese Patent Application Laid-open No. 2005-107645 (U.S. patent application Ser. No. 10/769,805, U.S. patent application Ser. No. 11/471,556) may be employed.

The SVP 23 is an information processing terminal (for example, a notebook personal computer) for performing maintenance or management of the primary storage system 600. The SVP 23 is connected, for example, via the internal line LAN 410 to a processor (for example, CPU) located in the CHA 21 or to a processor located in the DKA 22. The SVP 23 monitors the occurrence of malfunction inside the primary storage system 600 and displays it on a display screen, or instructs to perform blocking processing of the internal disk 400. The SVP 23 can be monitored from a remote management terminal 106.

The secondary storage system 40 may have the configuration of the primary storage system 600, or may have a configuration simpler than that of the primary storage system 600. For example, the secondary storage system 40 comprises a CHA 217 having a communication port 41 and one or a plurality of disks (referred to hereinbelow as "external disks") 500. The external LDEV 42 is provided on the storage area of the external disk 500. The external LDEV 42 is handled as the internal LDEV 132 of the primary storage system 600.

A configuration example of the computer system of the present embodiment is described above. Such a configuration is, however, but one example, and other configurations may be also employed. For example, rather than using the shared memory 25 and the cache memory 24 separately, one memory may be provided with a shared memory area and a cache memory area. Further, for example, the controller unit 20 may be a circuit board comprising a CPU, a memory, and a communication port. In this case, the CPU can execute the processing performed by a plurality of CHA or DKA. Further, a CHA having a function of the NAS node 10, in other words, a CHA that can function as a NAS (for the sake of convenience, it will be referred to hereinbelow as Embedded NAS, or "E-NAS", in an abbreviated form) may be installed in place of the CHA 21A in the primary storage system 600. In this case, the E-NAS may receive a file request from the client 301 and conduct processing by creating a block access request from the file access request.

The present embodiment will be described below in greater detail.

FIG. 2A shows an example of a computer program to be executed by the CPU located in the controller unit 20 of the primary storage system 600. When a computer program becomes a subject, as described hereinbelow, it actually means the performance of the processing by the CPU executing the computer program.

Examples of the programs include a Program 701 of Migration Execution that executes migration between LDEV, a Program 705 of Determination Control that determines whether the files duplicate and updates the Extent Management Table, a Program 707 of Access Control that controls the processing of the block access request from the NAS node 10, and a Program 709 of Table Provision that provides an LDEV Management Table. These computer programs 701, 705, 707, and 709 may be present in one of the storage resources located in the SVP 23, storage resources located in the CHA 21A, storage resources located in the CHA 21B, storage resources located in the DKA 22, internal disks 400, shared memory 25, and cache memory 24, or in a plurality thereof. These computer programs 701, 705, 707, and 709 may be executed in one or a plurality of the CPU located in the SVP 23, CPU located in the CHA 21A, CPU located in the CHA 21B, and CPU located in the DKA 22.

FIG. 2B is a configuration example of the Address Map Management Table.

The Address Map Management Table 801 is a table for managing the association of the virtual internal LDEV 132 and external LDEV 42 and is stored in the storage resources (for example, the shared memory 25) located in the primary storage system 600. For example, an identifier (LDEV number (VDEV number)) 8011 of the virtual internal LDEV 132, a WWN (World Wide Name) (or information of other type, such as a port number) 8012 corresponding to the external LDEV 42 associated therewith, and a LUN (Logical Unit Number) 8013 corresponding to the external LDEV 42 are recorded in the table 801.

FIG. 2C shows a configuration example of the LDEV Management Table.

The LDEV Management Table 803 is stored, for example, in the storage resources (for example, the shared memory 25) located in the primary storage system 600. The LDEV Management Table 803 is a table for recording information relating to the internal LDEV 31, 132. For example, a port number 8031, a LUN 8032, a LDEV number 8033, an access attribution 8034, a LDEV type 8035, and a usage state 8036 are recorded with respect to one internal LDEV (called "object internal LDEV" in the explanation of FIG. 2C hereinbelow) in one record of the table 803. The port number 8031 is an identifier (for example, a WWN) of the port corresponding to the object internal LDEV. The LUN 8032 is a LUN corresponding to the object internal LDEV. The LDEV number 8033 is the number of the object internal LDEV. If the port number 8031 and the LUN 8032 are indicated by a block access command, then access to the internal LDEV associated therewith is executed. The access attribution 8034 is the information for limiting the type of access to the object internal LDEV. Examples of such information include Read/Write (both the reading and the writing are allowed) and Read Only (only reading is allowed, and writing is prohibited). The Program 707 of Access Control does not update the internal LDEV even if a block write command is received for the internal LDEV corresponding to the "Read Only" access attribution 8034. The LDEV type 8035 is information indicating the type of the object internal LDEV. For example, it can be a real internal LDEV ("R") or a virtual internal LDEV ("V"). The usage state 8036 is information indicating the usage state of the object internal LDEV. For example, it is "In Use" or "Not Used".

Figure 3:
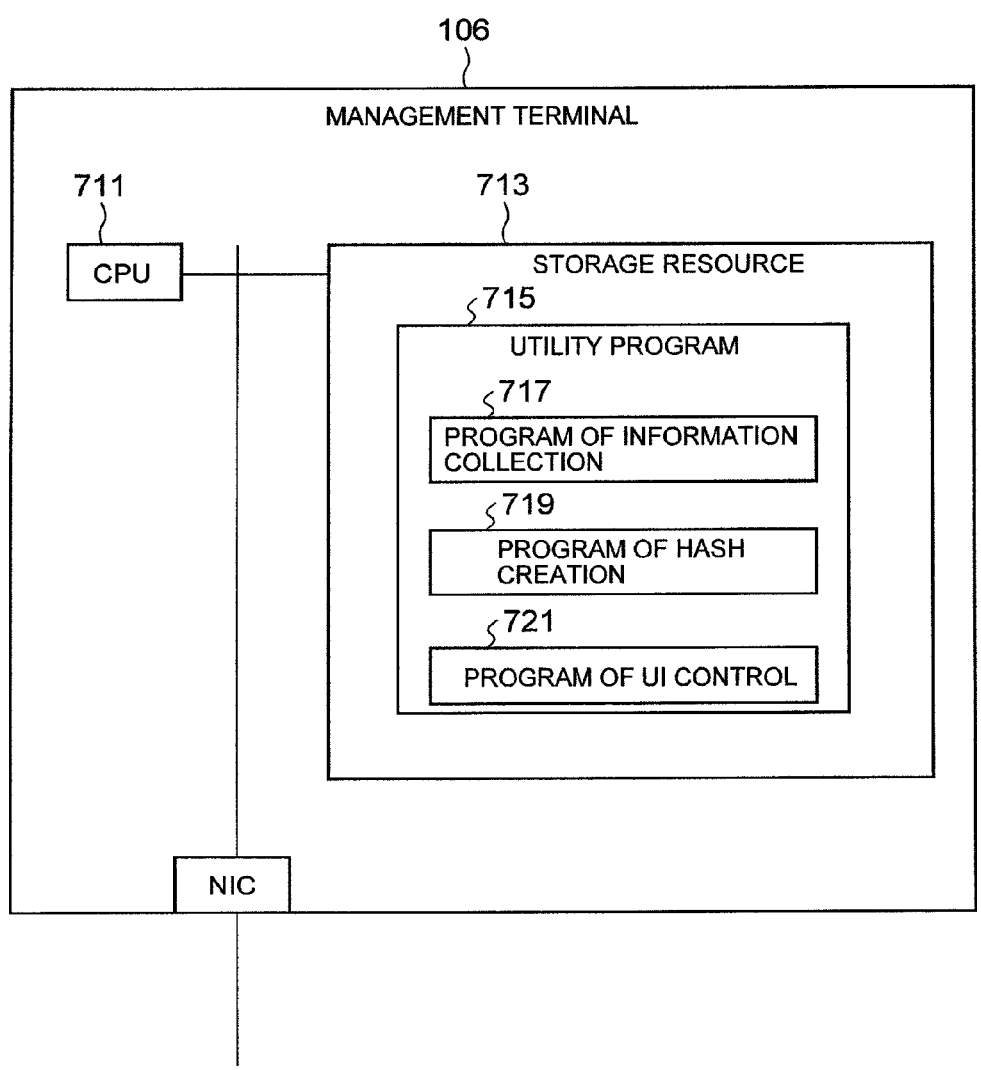
FIG. 3 shows a configuration example of a management terminal.

FIG. 3 shows a configuration example of the management terminal 106.

The Utility Program 715 that is executed by the CPU 711 of the management terminal 106 is stored in storage resources (for example, at least one from among a memory and a disk device) 713 of the management terminal 106. In the present embodiment, the Utility Program 715 is executed by the management terminal 106, but instead it may be executed by another computer such as the NAS node 10.

The Utility Program 715 includes, for example, a Program 717 of Information Collection, a Program 719 of Hash Creation, and a Program 721 of User Interface (UI) Control.

Figure 4:
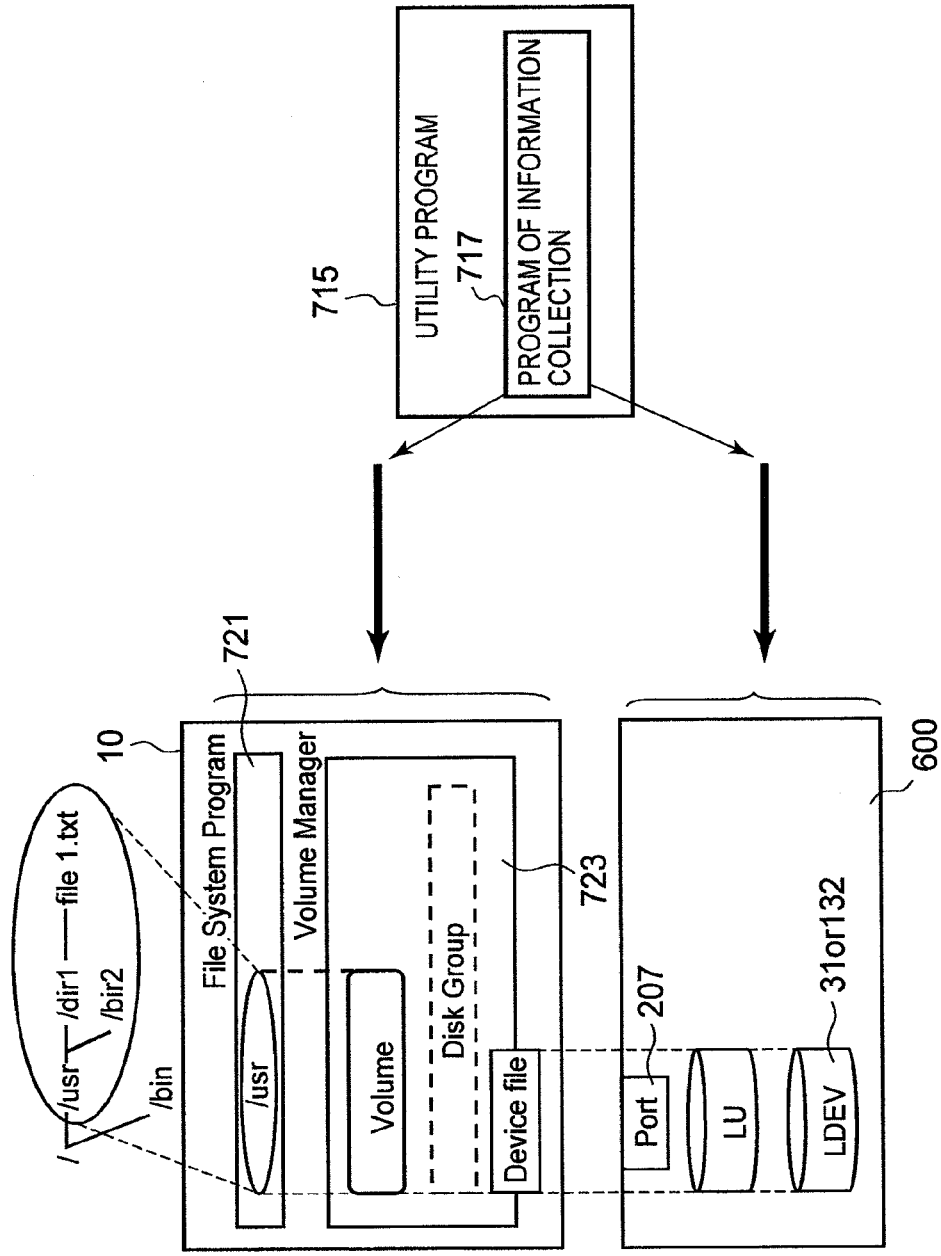
FIG. 4 illustrates information collection from an NAS node and a primary storage system.

As shown in FIG. 4, the Program 717 of Information Collection collects information of the predetermined types from the NAS node 10 and the primary storage system 600. An example of the collected information is shown in FIG. 5 and FIG. 6. The information shown by way of an example in FIG. 5 is Tables 811 and 813 of directory file information (refereed to hereinbelow as "Directory File Management Tables") that are managed by the File System Program 721 of the NAS node 10. The File System Program 721 is a computer program using a file system of one or a plurality of internal LDEV. A file can be acquired by referring to the contents described in the address of the Table 813 that is indicated by the i node information of the Table 811. The information shown by way of an example in FIG. 6 is a Table 831 in which information (information relating to a logical volume storing a file or a directory) managed by a volume manager 723 of the NAS node 10 is recorded and an LDEV Management Table Portion 833 that is a portion of an LDEV Management Table 803 (see FIG. 2C) managed by the primary storage system 600. A directory point name 8313, a device file name 8312, and a disk group name 8311 are recorded in the records of the Table 831. Further, a port number 8331, a LUN 8332, and a LDEV number 8333 (for example, values identical to those of 8031, 8032, and 8033 of FIG. 2C) are recorded for each internal LDEV 31, 132 in the Table Portion 833. A combination of the directory point name 8313, device file name 8312, and disk group name 8311 of the file system corresponds to one internal LDEV. Which combination corresponds to which internal LDEV can be specified, for example, by the numerical value in the device file name 8312 (for example, c0 means the primary storage system 600, t1 means the port number "1", and d1 means the LUN "1"). More specifically, for example, according to the example shown in FIG. 4, FIG. 5, and FIG. 6, it is clear that an internal LDEV corresponding to a file system having "/usr" as a route directory is an internal LDEV corresponding to a the port number "1", LUN "1", and LDEV number "1" (00:01). The above-described logical volume is a logical storage device recognized by the volume manager 723 and corresponds to the internal LDEV 31, 132 in the primary storage system 600.

The Program 719 of Hash Creation creates a Contents Identifier Management Table 835 shown by way of an example in FIG. 7 for one internal LDEV. One record of the Table 835 corresponds to one file. In one record, there are recorded a hash value (in other words, an identifier of the file contents) 8351 of the file corresponding to the record, an address (for example, a block number) 8352 indicating a position (position within the internal LDEV) where block data constituting the file have been saved, a file name 8353 of the file, a file address (for example, an address (for example, a path name to the directory storing the file) of the file managed by an i node)) 8354 of the file, and a storage period limit 8355 of the file. The Program 719 of Hash Creation calculates a hash value of the file from i node information (information recorded in the Directory File Management Tables 811 and 813) collected from the NAS node 10 by specifying the file contents and hash converting the file contents (by using a hash function). This hash value is sometimes referred to hereinbelow as "contents identifier". The storage period limit 8355 is, for example, information inputted by the user via a GUI shown by way of an example in the below-described FIG. 18A. The storage period limit 8355 may be also obtained by setting a value in advance in a file and copying this preset value, instead of inputting from the user. Further, information indicating the storage period may be also employed instead of the storage period limit 8355. Both the storage period limit and the storage period represent information indicating for how long a file has to be stored.

The Program 721 of UI Control can display a GUI (Graphical User Interface) shown by way of an example in FIG. 18A based on the information shown in FIG. 5 and FIG. 6 at a display device (for example, a display device of the management terminal 160). For example, the Program 721 of UI Control can display information relating to a plurality of LDEV in the GUI, receive the selection desired by the user from among a plurality of LDEV, and display information relating to at least one directory and/or at least one file stored in the LDEV selected by the user. Further, the program 721 of UI control receives the input of information indicating the storage period limit for at least one of each file, and when the information indicating the storage period limit for a certain file is inputted, the program records the inputted information as the storage period limit 8355 in the Contents Identifier Management Table 835 corresponding to the LDEV that stores this file.

Figure 9:
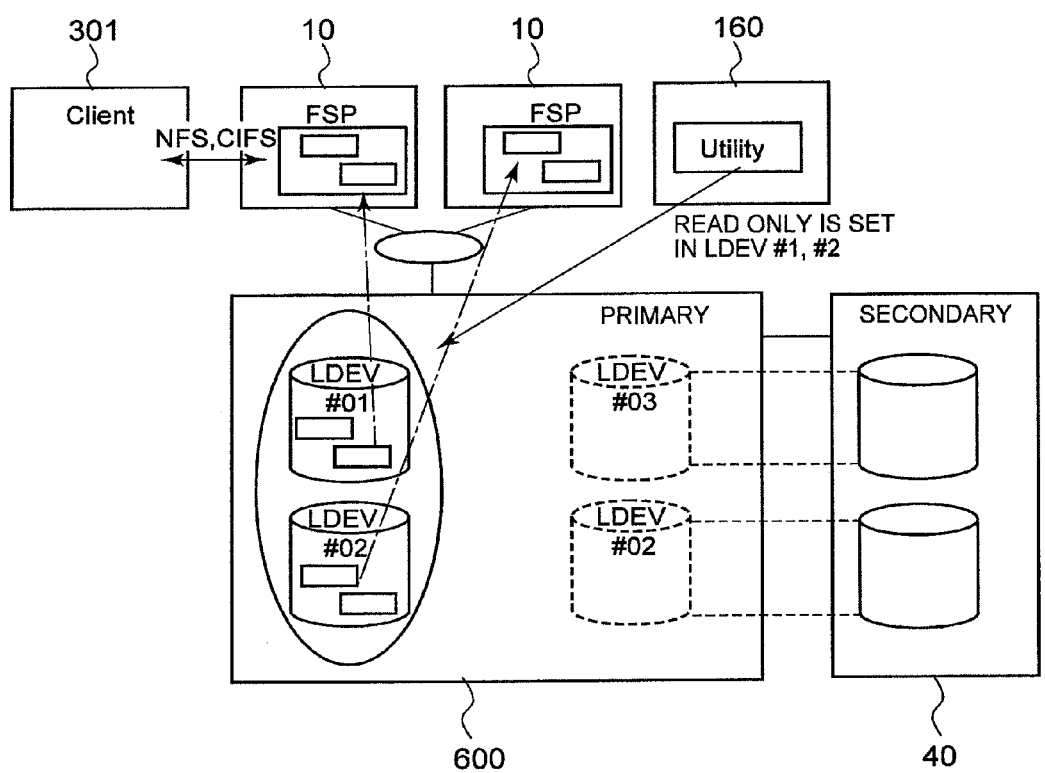
FIG. 9 shows how an access attribution "Read Only" is set in the internal LDEV of an archive object in S101 of FIG. 8.

The processing flow performed by the computer system of the present embodiment was described above. In the explanation below, it will be assumed that the association has been established between the Table 831 and the Table Portion 833 shown by way of an example in FIG. 6 and that information that is the object of subsequent collection is the information shown by way of an example in FIG. 5. Further, quadrangles within the LDEV and quadrangles within the FSP (File System Program) in FIG. 9 and FIG. 10 indicate files. Files with the same coloration pattern are files with identical contents. Therefore, hash values of the file contents are also assumed to be identical.

Figure 8:
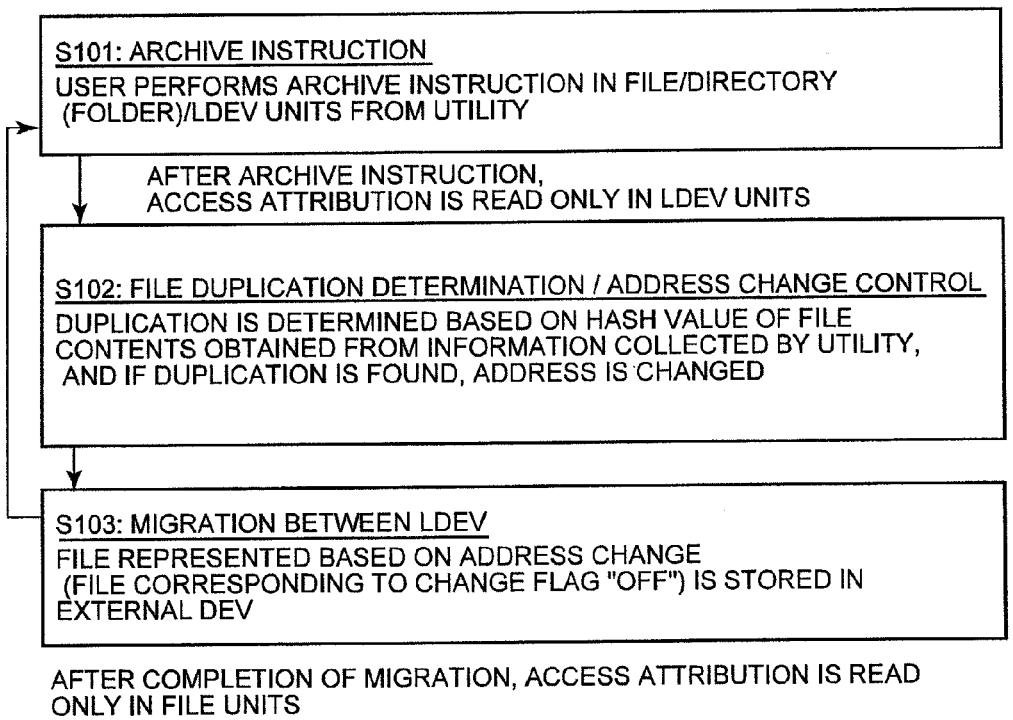
FIG. 8 shows in general a flow of processing performed in the computer system of the first embodiment.

<S101 of FIG. 8: Archive Instruction>

The Program 717 of Information Collection of the Utility Program 715 issues an information inquiry to the NAS node 10 or primary storage system 600. In response to the inquiry received by the NAS node 10, a predetermined computer program (for example, an agent program) transmits the Tables 811, 813 shown in FIG. 5 or the Table 831 shown in FIG. 6 to the Utility Program 715. In response to the information inquiry received by the primary storage system 600, the Program 709 of Table Provision transmits the LDEV Management Table Portion 833 to the Utility Program 715. The Program 717 of Information Collection associates the LDEV Management Table Portion 833 with the Table 831 as shown in FIG. 6. As for the correspondence relationship between the file, directory, and internal LDEV 31, 132, which file or which directory is stored in which internal LDEV is clear from the information shown in FIG. 5 and FIG. 6.

In response to completion of information selection, the Program 721 of UI Control displays the GUI shown in FIG. 18A, and the user receives an archive indication via the GUI in units of at least one type selected from among the internal LDEV units, directory units, and file units. If an archive indication is received that indicates at least one from the internal LDEV, directory, and file desired by the user, the Program 721 of UI Control sets the access attribution 8034 in the LDEV Management Table 803 relating to the indicated internal LDEV or the internal LDEV that stores the indicated directory or file (sometimes, these internal LDEV will be together referred to hereinbelow as "internal LDEV of the archive indication object") to "Read Only", as shown by way of an example in FIG. 9. In the example shown in FIG. 9, an internal LDEV #1 and an internal LDEV #2 are internal LDEV of the archive indication object, and "Read Only" of the access attribution 8034 is assumed to be set for each internal LDEV. The description "internal LDEV #1" means an internal LDEV for which the LDEV number 8033 is "1" (00:11).

Instead of setting the access attribution 8034 "Read Only", according to another method, it is possible to avoid writing into the internal LDEV of the archive indication object. For example, when the primary storage system 600 receives the indication of the internal LDEV of the archive indication object and then receives a block access command that indicates the internal LDEV, the primary storage system may inhibit writing by returning the predetermined response such as "Write Impossible" or "Busy".

Further, for example, the Program 721 of UI Control can also receive the storage period limit via the GUI shown in FIG. 18A for the file desired by the user. When the storage period limit has been received, the Program 721 of UI Control stores the corresponding relationship between the file name 8353 and the storage period limit 8355 in the storage resources 713, and when the Contents Identifier Management Table 835 is created, this storage period limit 8355 can be recorded in the Table 835.

Further, for example, the Program 721 of UI Control may receive the designation of the internal LDEV that will be a migration source via the GUI shown in FIG. 18A. Instead, the Program 721 of UI Control may also take the internal LDEV designated as the archive indication object (or an internal LDEV that stored a file or directory designated as the archive indication object) as the internal LDEV of a migration source, without special indication from the user.

For example, if the archive object is designated in the internal LDEV units and the association between the Table 831 and Table Portion 833 shown in FIG. 6 is established, the Table 811 and Table Portion 813 shown in FIG. 5 may be acquired from the NAS node 10 in the next step S102, without performing information collection in this step S101.

<S102 of FIG. 8: File Duplication Determination/Address Change Control>

For example, in response to the completion of setting the access attribution 8034 "Read Only" in S101, the Program 719 of Hash Creation creates the Contents Identifier Management Table 835 for each internal LDEV that is the archive indication object. This procedure will be explained below with reference to one internal LDEV. For example, the Program 719 of Hash Creation refers to the Tables 311 and 313 shown in FIG. 5, calculates the hash values of the file contents for each file stored in the internal LDEV, specifies the real storage position of the file (for example, a block number for identifying a block within the internal LDEV), and records the calculated hash values 8351 together with the specified address (physical storage position) 8352, file name 8353, and file address 8354 in the Contents Identifier Management Table 835. Further, the Program 719 of Hash Creation records the storage period (storage period limit inputted by the user via the GUI in S101) 8355 that has been stored in the storage resources 713 in the Contents Identifier Management Table 835.

Figure 10:
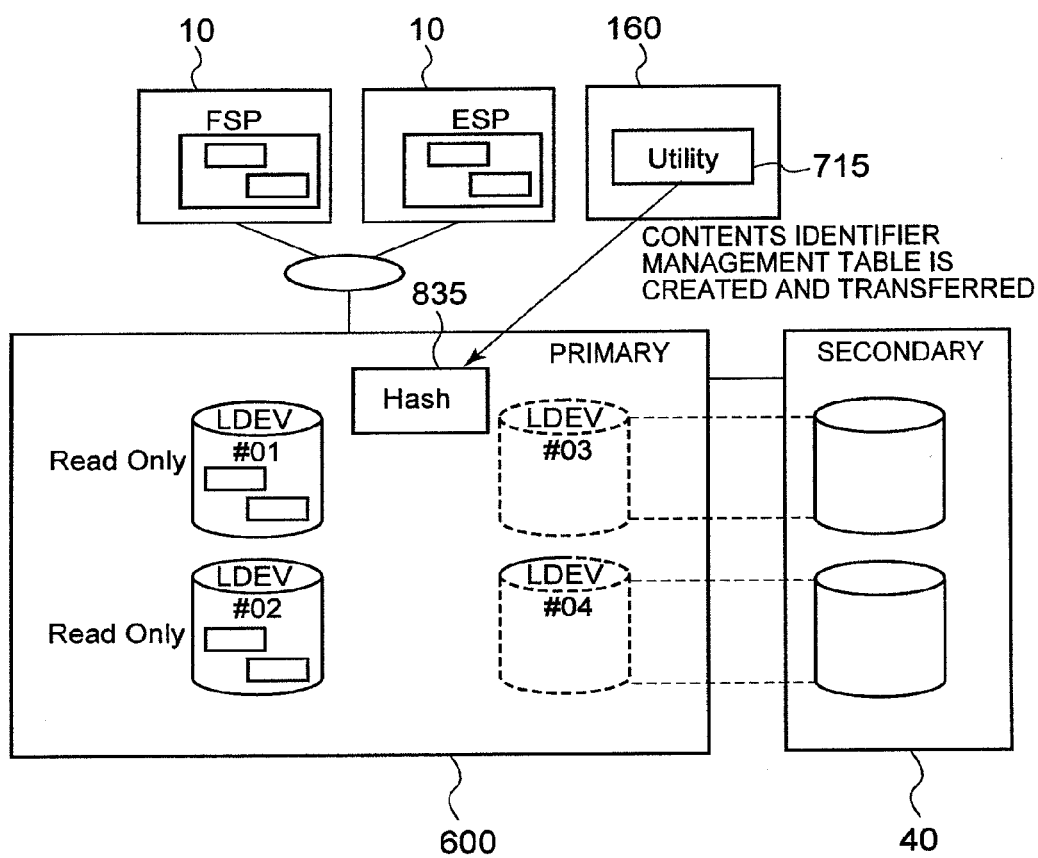
FIG. 10 shows how a Contents Identifier Management Table is created and transmitted to a primary storage system in S102 of FIG. 8.

As shown in FIG. 10, the Program 719 of Hash Creation transmits the Contents Identifier Management Table 835 for each internal LDEV that is the archive indication object to the primary storage system 600, and the primary storage system 600 receives this table. The Program 705 of Determination Control stores the received Contents Identifier Management Table 835 in the storage resources (for example, the shared memory 25) located in the primary storage system 600.

Figures 11, 12:
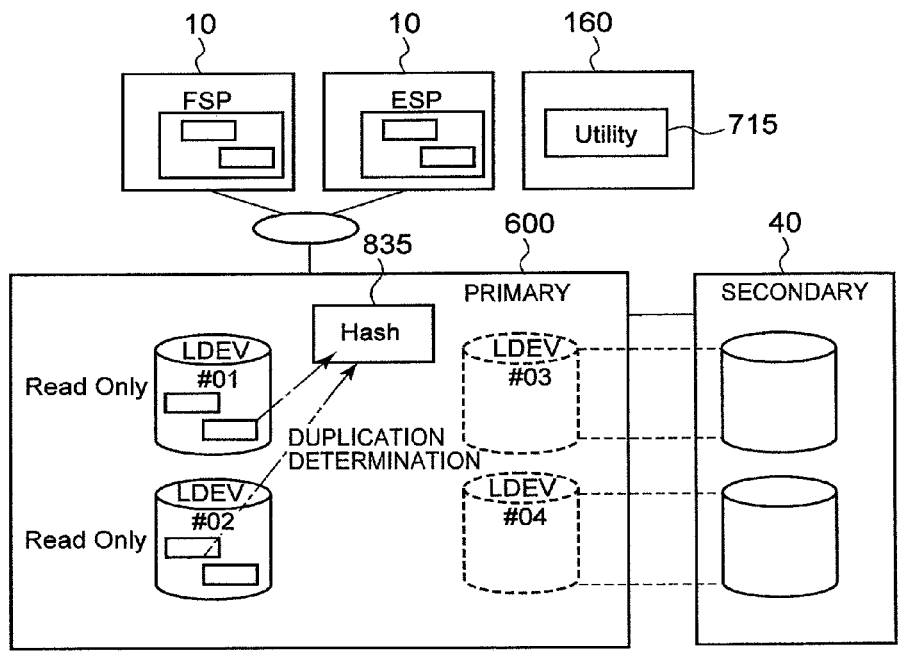
FIG. 11 shows a configuration example of Extent Management Table.
FIG. 12 illustrates how the presence of duplicate files is determined in S102 of FIG. 8.

The Program 705 of Determination Control creates an Extent Management Table for each internal LDEV that is the archive indication object based on the Contents Identifier Management Table 835 for each internal LDEV that is the archive indication object. FIG. 11 shows an example of the Extent Management Table. One record of the Extent Management Table 861 (referred to hereinbelow as "extent record") corresponds to one record of the Contents Identifier Management Table 835 (referred to hereinbelow as "hash record") and, therefore, corresponds to one file. One extent record has recorded therein an ID 8611, an address 8612, an access attribution 8613, a storage period limit 8614, a change flag 8615, an extent ID 8616, and a VDEV number 8617. The ID 8611 is, for example, a sequence number of the corresponding hash record. The address 8612 is a copy of the address 8352 recorded in the corresponding hash record. The access attribution 8613 is information (for example, Write/Read, Read Only) indicating the access attribution for the corresponding file. Immediately after the Extent Management Table 861 has been created, a copy of the access attribution 8034 for the internal LDEV corresponding to the Table 861 is recorded in all the extent records. The storage period limit 8614 is, for example, a copy of the storage period limit 8355 that has been recorded in the corresponding hash record. The change flag 8615 is a flag indicating whether (On) or not (Off) the address is changed. The extent ID 8616 is a value that is set when the change flag is "On" and indicates the ID 8611 that has to be referred to. The VDEV number 8617 is a value that is set when the change flag 8615 is "On" and indicates the LDEV number (VDEV number) 8011 (LDEV number (VDEV) number 8011 that has been recorded in the Address Map Management Table 801) that has to be referred to. Immediately after the Extent Management Table 861 has been created, the change flag 8615 becomes "Off" in all the extent records, and the storage areas of the extent ID 8616 and the VDEV number 8617 become blank or ineffective values are set therein.

Figure 13:
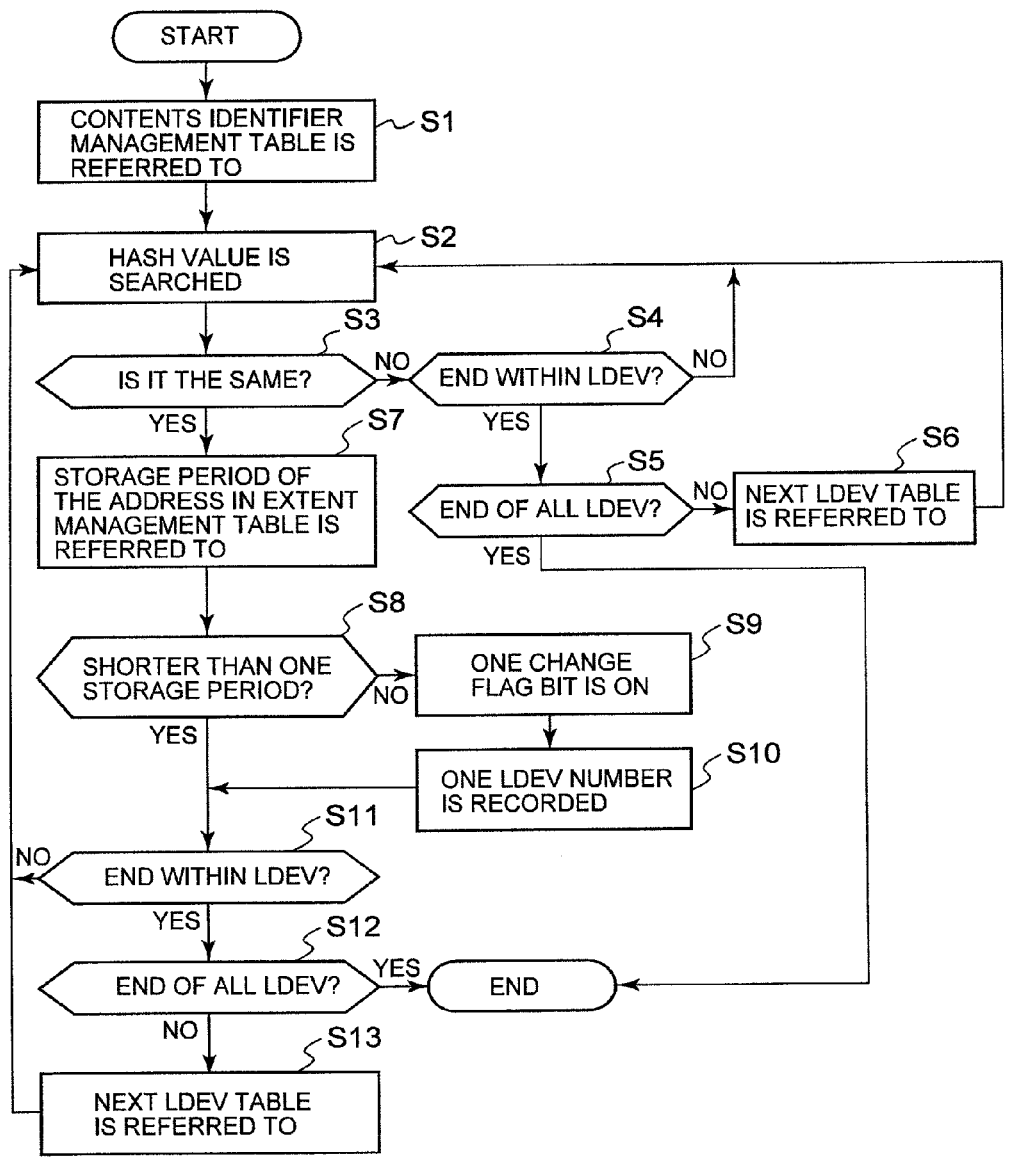
FIG. 13 shows an example of address control processing flow executed in S102 of FIG. 8.

The Program 705 of Determination Control determines whether the duplicate files are present and performs the address change control, as shown in FIG. 12. More specifically, the address control processing shown by way of an example in FIG. 13 is executed.

Thus, the Program 705 of Determination Control refers to the Contents Identifier Management Table 835 selected from all the recorded Contents Identifier Management Tables 835 (S1) and retrieves from the Contents Identifier Management Table 835 a hash value (referred to hereinbelow as "matching hash value") 8351 that matches the hash value (referred to hereinbelow as "selected hash value") 8351 selected from the Table 835 (S2). If no matching hash value 8351 is found in the Table 835 (S3: NO, S4: YES) and if another Contents Identifier Management Table 835 that has not yet been referred to is present (S5: NO), then the Program 705 of Determination Control refers to the other Contents Identifier Management Table 835 (S6) and retrieves the matching hash value 8351 from this Table 835.

In the case where the matching hash value 8351 has been found (S3: YES), the Program 705 of Determination Control refers to and compares one storage period limit 8355 (storage period limit 8355 corresponding to the selected hash value 8351) and another storage period limit 8355 (storage period limit 8355 corresponding to the matching hash value 8351) (S7). If the period indicated by one storage period limit 8355 is longer, the process flow advances to step S11. If the period indicated by one storage period limit 8355 is shorter, the Program 705 of Determination Control sets one change flag 8615 (change flag 8615 corresponding to the selected hash value 8351) to "On" (S9). Further, if the matching has value 8351 was found from the other Contents Identifier Management Table 835, the Program 705 of Determination Control records the LDEV number of the internal LDEV corresponding to this Table 835 as one VDEV number 8617 (change flag 8615 corresponding to the selected hash value 8351) (S10).

In step S11, the Program 705 of Determination Control determines whether or not all the hash codes of the Table 835 that is the present reference object have been referred to, and if all the hash codes have not been referred to (S11: NO), the processing flow returns to step S2, whereas if all the hash codes have been referred to (S11: YES), the processing flow advances to S12. In step S12, the Program 705 of Determination Control determines the presence of the Contents Identifier Management Table 835 that has not been referred to, and if the Table 835 that has not been referred to is present (S12: YES), this table is referred to (S13), and if such table is absent (S12: NO), the processing ends.

In the explanation referring to FIG. 13, in the case where the matching hash value 8351 is found from the Contents Identifier Management Table 835 where the selected hash value 8351 is present, as shown by way of an example in FIG. 14A, the Extent Management Table 861 corresponding to this Table 835 is updated, for example, as shown in FIG. 14B. Thus, if an ID 8611 corresponding to the selected hash value 8351 is taken as "1" and an ID 8611 corresponding to the matching hash value 8351 is taken as "0", then the storage period limit 8614 "2010.01.01" corresponding to the ID 8611 "1" will be shorter than the storage period limit 8614 "2020.01.01" corresponding to the ID 8611 "0". Therefore, the change flag 8615 corresponding to the ID 8611 "1" will be made "On" and the extent ID 8616 corresponding thereto will be made "0". As a consequence, in the case where a file access request designating a file corresponding to ID "1" is transmitted from the client 301, a file corresponding to ID "0" is supplied to the client 301.

On the other hand, in the explanation referring to FIG. 13, as shown by way of an example in FIG. 15A, when a matching hash value 8351 is found from the second Contents Identifier Management Table 835 that is different from the first Contents Identifier Management Table 835 where the selected hash value 8351 is present, the first Extent Management Table 861 corresponding to the first Contents Identifier Management Table 835 and the second Extent Management Table 861 corresponding to the second Contents Identifier Management Table 835 are updated, for example as shown in FIG. 15B. Thus, if an ID 8611 corresponding to the selected hash value 8351 is taken as "10" (located in the second Extent Management Table 861) and an ID 8611 corresponding to the matching hash value 8351 is taken as "0" (located in the first Extent Management Table 861), then the storage period limit 8614 "2010.01.01" corresponding to the ID 8611 "10" will be shorter than the storage period limit 8614 "2020.01.01" corresponding to the ID 8611 "0". Therefore, the change flag 8615 corresponding to the ID 8611 "1" will be made "On" and the extent ID 8616 corresponding thereto will be made "0". Furthermore, the VDEV number 8617 corresponding to the ID "10" will be taken as the LDEV number "01" of the internal LDEV corresponding to the first Extent Management Table 861.

The step S102 shown in FIG. 8 is explained above. In this step S102, the Utility Program 715 or Program 705 of Determination Control may delete the body of at least one file other than the one file from among a plurality of duplicate files, based on the created Contents Identifier Management Table 835, before the migration relating to the secondary system 40 is executed in the below-described step S103 shown in FIG. 8. Further, the file body may be replaced, rather than deleted, with a link (for example, a symbolic link or a shortcut) indicating the file body. In this case, where the access attribution 8613 has been set in advance as "Read Only", in order to perform deletion or replacement, the Utility Program 715 or Program 705 of Determination Control may temporarily cancel the setting of the access attribution 8613, complete the deletion or link replacement processing, and then again set the access attribution 8613 to "Read Only". When the deletion or link replacement has been performed in this step S102, the migration of S103 of FIG. 8 may be performed simply as the migration between LDEV (between logical volumes). In other cases, as described below, the migration may be performed based on the change flag 8615 of the Extent Management Table 861 of the migration source.

<S103 of FIG. 8: Migration Between LDEV>

Figures 16A, 16B, 16C, 16D:
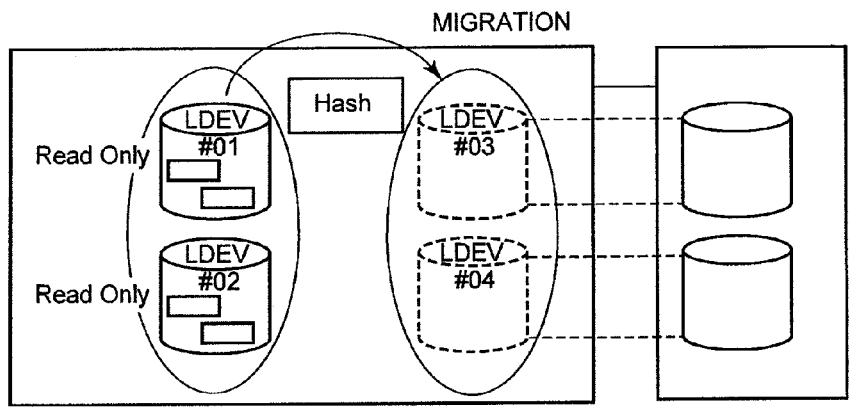
FIG. 16A shows migration between LDEV in S103 of FIG. 8.
FIG. 16B shows an example of the LDEV Management Table before the migration.
FIG. 16C shows an example of the LDEV Management Table during migration.
FIG. 16D shows an example of an Address Map Management Table before the migration and during the migration.

For example, in response to the processing flow explained with reference to FIG. 13, the Program 701 of Migration Execution located within the primary storage system 600 can determine the migration destination of data located within the real internal LDEV #1, #2 that are the archive indication objects as virtual internal LDEV #3, #4, as shown in FIG. 16A.

In the present embodiment, a file is stored in the real internal LDEV and the file read or write is executed with respect to the real internal LDEV before the archive indication. As a result, the internal LDEV that is the archive indication object is a real internal LDEV, and the internal LDEV that is the migration source is, therefore, also the real internal LDEV. By contrast, the migration destination is a virtual internal LDEV, as shown by way of an example in FIG. 16A. More specifically, for example, before the migration, as shown in FIG. 16B, the LDEV types 8035 corresponding to the LDEV number 8033 "3" and "4" are all "V" in the LDEV Management Table 803 and the usage state 8036 is "Not Used". As a result, as shown in FIG. 16C, the LDEV number (VDEV number) 8011 is taken as "03" and "04" in the Address Map Management Table 801. In this case, the migration execution program 701 refers to the LDEV Management Table 803 and determines the migration destination of data that have been stored in the real internal LDEV #1, #2 as the virtual internal LDEV #3, #4, respectively. Furthermore, the migration execution program 701 can update the usage states 8036 corresponding to the LDEV numbers 8033 "3" and "4" to "In Use". The migration destination may be determined automatically as described hereinabove, or may be determined manually via a GUI displayed by the Program 721 of UI Control.

The Program 701 of Migration Execution initiates the migration of data located in the real internal LDEV #1, #2 to the virtual internal LDEV #3, #4. If the NAS node 10 receives from the client 301 the file read request that designates the file that has been stored in the real internal LDEV #1 in the course of the migration, the NAS node 10 transmits the block read request designating the internal LDEV #1 to the primary storage system 600. The LDEV Management Table 803 is, for example, such as shown by way of an example in FIG. 16C, and the Program 707 of Access Control reads data from the real internal LDEV #1 and transmits them to the NAS node 10 according to this block read request. In other words, the client 301 can read the file that is the archive object via the NAS node 10 even during the migration.

When the Program 701 of Migration Execution performs the migration of data located in a position within the real internal LDEV #1 that is specified, for example, from a certain address 8612 to the virtual internal LDEV #3, the program refers to the change flag 8615 corresponding to this address 8612, and when the change flag 8615 is "Off", the data are migrated to the virtual internal LDEV #3, whereas when the change flag 8615 is "On", the data are not migrated to the virtual internal LDEV #3 (for example, these data may be deleted). In other words, the data of at least one file other than the one file of the duplicate files are not migrated to the virtual internal LDEV of the migration destination. In other words, the amount of data that is written into the virtual internal LDEV of the migration destination can be decreased by comparison with the amount of data that has been stored in the real internal LDEV of the migration source. For example, for the data that were migrated to the virtual internal LDEV #3, an external LDEV corresponding to the virtual internal LDEV #3 is specified from the Address Map Management Table 801 by the migration execution program 701, and the block right command that designates the WWN 8012 or LUN 8013 of the specified external LDEV is transmitted to the primary storage system 40.

Figure 17:
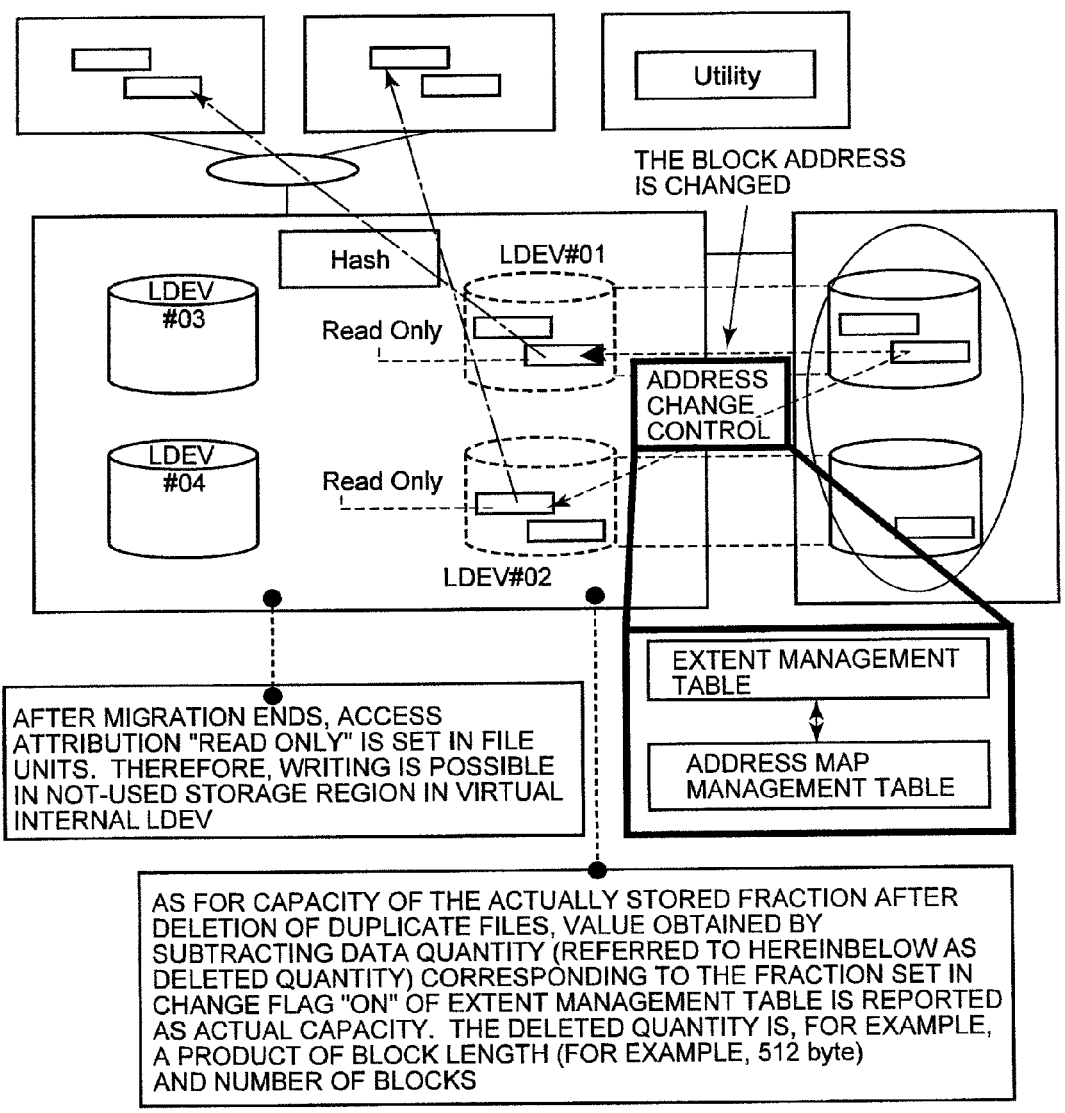
FIG. 17 shows an access path after the migration.

Once the migration has been completed, the Program 701 of Migration Execution exchanges the LDEV numbers of the migration source and migration destination, as shown in FIG. 17. More specifically, for example, the Program 701 of Migration Execution exchanges the port number 8031, LUN 8032, and LDEV number 8033 of the migration source and the port number 8031, LUN 8032, and LDEV number 8033 of the migration destination in the LDEV Management Table 803, as shown in FIG. 22A (furthermore, the usage state 8036 of the internal LDEV #3, #4 may be changed to "Not Used", as shown in FIG. 22A). Further, the Program 701 of Migration Execution overwrites the LDEV number 8033 of the migration source as a new LDEV number (VDEV number) 8011 on the LDEV number (VDEV number) 8011 of the migration destination in the Address Map Management Table 801, as shown in FIG. 22B.

Then, for example, as shown in FIG. 17, when the NAS node 10 receives a file read request designating the file that has been stored in the virtual internal LDEV #2 from the client 301, the NAS node 10 transmits the block read request designating the virtual internal LDEV #2 and the access destination address thereof to the primary storage system 600. The LDEV Management Table 803 and the Address Map Management Table 801 are such as shown by way of an example in FIG. 22A, and FIG. 22B, respectively. Further, in the Extent Management Table 861 that corresponds to the virtual internal LDEV #2, the change flag 8615 corresponding to this access destination address becomes "On", the VDEV number 8617 becomes the VDEV number of the virtual internal LDEV #1, and a corresponding extent ID 8616 is present in the access destination address. An address 8612 is specified from a record in which the corresponding extent ID 8616 of the Extent Management Table 861 corresponding to the virtual internal LDEV #1 has been recorded as the ID 8611. Therefore, the Program 707 of Access Control can read data from a position corresponding to the specified address 8612 of the external LDEV corresponding to the virtual internal LDEV #1 according to the block read request received from the NAS node 10 and can transmit the data to the NAS node 10. In other words, in the case where a file in which a file body is present in the external LDEV corresponding to the internal LDEV #1, this file being located in the internal LDEV #2, is designated as an access destination, the external LDEV corresponding to the internal LDEV #2 is not accessed, but the external LDEV corresponding to the internal LDEV #1 is accessed by the Extent Management Table 861 or Address Map Management Table 801 corresponding to the internal LDEV #2, #1 (in other words, the access path is changed).

Further, the access attribution 8613 "Read Only" is associated with the address 8612 described in the Extent Management Table 861 corresponding to the virtual internal LDEV #1, #2. Therefore, the migrated data cannot be written, but the access attribution 8034 of the virtual internal LDEV #1, #2 becomes "Read/Write". Therefore, the data can be written into positions other than the positions where the migrated data have been stored. In other words, before the migration, the access attribution "Read Only" is set in the internal LDEV units, but after the migration, the access attribution "Read Only" is set in file units. For example, in the case where only a file with a file name "file1.txt" is designated as an archive object and an archive indication is issued in the GUI shown in FIG. 18A and displayed by the Utility Program 715 and then a migration is performed with respect to this file, the access attribution of this file becomes "Read Only" in the migration destination, as represented by the GUI of FIG. 18B.

The first embodiment was explained above.

As for the hash value recorded in the Contents Identifier Management Table 835, when the archive object is designated in file units, the hash value of the designated file is recorded, and when the archive object is designated in directory units, the hash value of each file located in the designated directory is recorded. The data that will be migrated also can be made a file designated as an archive object (or a file in a directory designated as an archive object).

Further, the Program 701 of Migration Execution can report as an actual transition object data quantity a value obtained by subtracting the capacity of a block section (for example, a product of a block length 512 byte and the number of blocks) specified from the address 8612 corresponding to the change flag 8615 "On" in the Extent Management Table 861 corresponding to the internal LDEV #1, #2 from the transition object data quantity, as shown in FIG. 17. More specifically, for example, if a first file is deleted when the access destination of the first file is changed to the second file, the saved storage capacity may be calculated based on the number of blocks where the body of the first file was stored. Further, for example, if the first file is processed by replacing with a link, the saved storage capacity may be calculated based on the value obtained by subtracting the number of blocks that store the information of the replaced link from the number of blocks storing the body of the first file.

Further, for example, the Utility Program 715 may be executed by the NAS node 10. The Utility Program 715 may save the Contents Identifier Management Table 835 of each internal LDEV of the archive indication object in storage resources of the NAS node 10. When read access to a certain file is executed, the Utility Program 715 or the Program 705 of Determination Control compares the hash value 8351 present in the Contents Identifier Management Table 835 saved by the Utility Program 715 and located in the hash record corresponding to the file of this read object with the hash value 8351 on the hash record corresponding to the file of the read object in the Contents Identifier Management Table 835 that has been stored in the storage resources of the primary storage system 600, and if the two hash values are the same, the program decides that the contents of the file of the read object is correct and reads the file, whereas if the two hash values differ from each other, the program may decide that the contents of the file of the read object is incorrect and may return the determination results to the read access source. Further, the above-described comparison and determination may be executed at the predetermined timing, for example, in the case where the storage period limit of the file is shorter than the predetermined period, instead of reading.

In accordance with the above-described first embodiment, the presence of duplicate files in a plurality of files that are the archive objects is determined and when the duplicate files are found, at least one of the duplicate files is left and at least one of the duplicate files is eliminated. However, in the NAS node 10, the duplicate files appear to be present unchanged. The access destination of the eliminated file is associated with the access destination of the body of the remaining file by updating the information stored in the Extent Management Table 861 and Address Map Management Table 801. As a result, it becomes unnecessary to use the hash value itself for the file address and, therefore, no special API has to be provided in the NAS node 10.

Further, according to the first embodiment, the information relating to the repository of files such as access attribution relating to the files stored in the secondary storage system 40 is collected in the primary storage system 600. As a result, when the number of files that are the archive objects increases and the information capacity is wished to be increased, the secondary storage system 40 may be enlarged as a storage system for the archive. Thus, it is not necessary to introduce a device having special functions when the information capacity for the archive is increased, and the storage system of the already existing product can be effectively used.

Further, according to the first embodiment, when an archive indication is issued, migration is performed from the real internal LDEV 31 into the virtual internal LDEV 132, and then the port number 8031, LUN 8032, and LDEV number 8033 of the migration source and the port number 8031, LUN 8032, and LDEV number 8033 of the migration destination are exchanged. Therefore, even after the migration of files that are the archive objects, the NAS node 10 can acquire the data identical to those before the migration if the location identical to that before the migration is indicated, without being aware of the migration destination.

Second Embodiment

The second embodiment of the present invention will be described below. The difference between the first and second embodiment will be mainly described below and the explanation of common features of the two embodiments will be omitted or simplified.

For example, it will be assumed that a plurality of external LDEV are present in one or a plurality of secondary storage systems 40, and that the plurality of external LDEV have different characteristics (referred to hereinbelow as "external LDEV characteristics"). The external LDEV characteristics differ depending on the type of external storage device (for example, an external disk 500) used to prepare the external LDEV. For example, at least one characteristic from among performance (for example, transfer speed), reliability, cost, and storage device type (for example, a hard disk or a flash memory) can be used as the external LDEV characteristic. More specifically, for example, if the external storage device has a high speed and high reliability, the external LDEV characteristics of the external LDEV prepared by using the external storage device will be a high-speed and high-reliability characteristic. Furthermore, for example, if the external storage device has a low speed and low cost, the external LDEV characteristics of the external LDEV prepared by using the external storage device will be a low-speed and low-cost characteristic. In the explanation below, it will be assumed that there are first to third external LDEV corresponding to the first to third virtual internal LDEV, respectively, and that the external LDEV characteristic of the first external LDEV is a high-speed and high-reliability characteristic, whereas the external LDEV characteristics of the second and third external LDEV are low-speed and low-cost characteristics. Further, it is assumed that three duplicate files (first to third files) will be migrated into the first to third virtual internal LDEV, respectively. However, whether actual migration is performed (in other words, whether data (body) of a file are written into the external LDEV) will be controlled by the below-described elimination determination criterion. Further, in the explanation below, a long or short storage period limit 8614 means that the term indicated by the storage period limit 8614 is long (in other words, farther in the future) or short, respectively.

As shown in FIG. 19A, in the first embodiment, the storage period limit 8614 of a file is the only criterion (referred to hereinbelow as "elimination determination criterion") for determining which file body from among the duplicate files will be left and which file body will be eliminated (for example, deleted or replaced with a link). For this reason, for example, if the first storage period limit 8614 is the longest of the three duplicate files as in Case 1, the first file is written into the first external LDEV, and the second and third files are not written into the second and third external LDEV. As a result, the bodies of the three duplicate files are saved in the first external LDEV (high-speed and high-reliability external LDEV) at least until the first storage period limit 8614 is reached. However, if the third storage period limit 8614 is the longest of the three duplicate files as in Case 2, the bodies of the three duplicate files are saved in the third external LDEV (low-speed and low-reliability external LDEV). For this reason, the body of the file that has to be saved until the longest period limit is reached, will be saved continuously in the low-speed and low-cost external LDEV.

Accordingly, as shown in FIG. 19B, in the second embodiment, an external LDEV characteristic is also used in addition to the storage period limit 8614 as the elimination determination criterion. More specifically, for example, as shown in FIG. 20, an external LDEV characteristic 8014 can be recorded in each record of an Address Map Management Table 801' and by referring to the Table 801' it can be possible to specify which virtual internal LDEV is associated with which externally LDEV having any characteristic external LDEV. As shown in FIG. 19B, in Case 1, the storage period limit 8614 of the first file is the longest and the first file is migrated into the first virtual internal LDEV. Therefore, eventually, the bodies of the three duplicate files are written only into the first external LDEV in the same manner as in FIG. 19A. However, for example, in Case 2, the third storage period limit 8614 is the longest, and in the third file the storage period limit 8614 thereof is the longest. Therefore, the body of the third file is written into the third external LDEV, while the body of the first file is written into the first external LDEV by taking into consideration that the migration destination thereof corresponds to the high-speed and high-reliability external LDEV. Further, because the storage period limit 8614 of the second file is the shortest, the body is eliminated and an access change control is performed so as to access any one of the body of the first file and the body of the third file. As for which of the files will be accessed, the body of the third file with the longest storage period limit 8614 may be accessed, but with consideration for the access competition, the body of the first file may be also accessed, as shown in FIG. 19B. Further, in the case where the body of the first file cannot be acquired, for example, because failure has occurred in the first external LDEV, the Extent Management Table 861 may be updated in order to change the access destination of the first and second files to the third file. The impossibility of referring to the file can thus be avoided.

An example of the address control processing flow of the second embodiment is shown in FIG. 21.

The Program 705 of Determination Control refers to all the Contents Identifier Management Tables 835 corresponding to all the internal LDEV of the archive object and retrieves two or more identical hash values 8351 (S51). If such hash values 8351 are not found, the processing may be completed.

If the external LDEV attribution 8014 has not been associated (S52: NO) with at least one or all the virtual internal LDEV from among one or more virtual internal LDEV that are the migration destinations of a plurality of files corresponding to at least two identical hash values 8351, the Program 705 of Determination Control advances to step S61, and if the external LDEV attribution 8014 has been associated with these one or more virtual internal LDEV (S52: YES), the program advances to S54 or S56.

In S61, the Program 705 of Determination Control selects the longest storage period limit 8614 from among a plurality of storage period limits 8614 of files corresponding to two or more identical hash values 8351. More specifically, for example, the change flag 8615 corresponding to a hash value 8351 with a shorter storage period limit 8614 from among the matching hash value and the selected hash value 8351 from among two or more identical hash values 8351 is set to "On", the extent ID 8616 is updated, and if necessary, a VDEV number 8617 is updated. This is executed by the Program 705 of Determination Control by taking each of two or more identical hash values 8351 as the selected hash values 8351. As a result, if there is only one longest storage period limit 8614 in a plurality of files corresponding to two or more identical hash values 8351, this storage period limit 8614 is selected and the processing flow advances to S62. If a plurality of the longest storage period limits 8614 (in other words, identical storage period limits 8614) are present, as shown in step S70 in FIG. 21, the Program 705 of Determination Control selects the storage period limit 8614 with a large number of change flags 8615 "On" (that is, the storage period limit 8614 corresponding to the file in which a large number of address change destinations are present) as the longest storage period limit 8614. If the number of change flags 8615 "On" is the same, the Program 705 of Determination Control selects one storage period limit 8614 that was selected arbitrarily (for example, a storage period limit 8614 of a comparative source) as the longest storage period limit 8614.

In step S62, the Program 705 of Determination Control updates each Extent Management Table 861 so as to access a file corresponding to the storage period limit 8614 having selected therefor in S61 at least one file corresponding to the storage period limit 8614 that was not selected in S61. More specifically, the Program 705 of Determination Control sets to "On" the change flag 8615 corresponding to unselected another storage period limit 8614, without changing the "Off" state of the change flag 8615 corresponding to the selected storage period limit 8614. The Program 705 of Determination Control changes the extent ID 8616 corresponding to "On" of the change flag 8615 to ID 8611 on the record corresponding to the selected storage period limit 8614. Further, the Program 705 of Determination Control updates, as necessary, the VDEV number 8167 corresponding to the change flag 8615 "On".

A case in which all the external LDEV 8014 characteristics associated with one or more internal LDEV are "high speed and high reliability" is a case in which the processing flow advances to S54 after YES in S52. A case in which "high speed and high reliability" is mixed with "low speed and low cost" in these one or more external LDEV characteristics 8014 is a case in which the processing flow advances to S56.

In S54, the Program 705 of Determination Control selects the longest storage period limit 8614 from among the storage period limits 8614 of a plurality of files (a plurality of files corresponding to "high speed and high reliability") corresponding to two or more identical hash values 8351. If there are a plurality of the longest storage period limits 8614 (in other words, identical storage period limits 8614), the processing flow advances to S70 of FIG. 21.

In S55, the Program 705 of Determination Control updates the Extent Management Table 861 so as to access a file corresponding to the storage period limit 8614 having selected therefor in S54 one or more files corresponding to the storage period limits 8614 that was not selected in S54.

In S56, the Program 705 of Determination Control selects the longest storage period limit 8614 from among one or more storage period limits 8614 corresponding to the external LDEV characteristic 8014 "low speed-low cost" from among the storage period limits 8614 of a plurality of files corresponding to two or more identical hash values 8351. If there are a plurality of the longest storage period limits 8614 (in other words, identical storage period limits 8614), the processing flow advances to S70 of FIG. 21. Further, in this step S56, the longest storage period limit 8614 may be also selected from one or more storage period limits 8614 corresponding to "high speed and high reliability".

In S57, the Program 705 of Determination Control compares the longest storage period limits 8614 that was selected for "high speed and high reliability" (referred to hereinbelow as "high-speed term 8614") with the longest storage period limits 8614 that was selected for "low speed and low cost" (referred to hereinbelow as "low-speed term 8614").

If the comparison results of S57 demonstrate that the low-speed term 8614 is longer than the high-speed term 8614 (S58: YES), the Program 705 of Determination Control leaves the change flag 8615 corresponding to the storage period limit 8614 at "Off", sets the change flag 8615 corresponding to other storage period limits 8614 relating to "low speed and low cost" to "On", and updates the extent ID 8616 corresponding to other storage period limits 8614 so that the access destination of the file corresponding to the other storage period limit 8614 is a file corresponding to the high-speed term 8614 (S59).

If the comparison results of S57 demonstrate that the low-speed term 8614 is less than the high-speed term 8614 (S58: NO), the Program 705 of Determination Control sets the change flag 8615 corresponding to the low-speed term 8614 and the change flag 8615 corresponding to the other storage period limit 8614 relating to "low speed and low cost" to "On" and updates the extent ID 8616 and the like corresponding to all these files so that access destination of all the files relating to "low speed and low cost" is set to a file corresponding to the high-speed term 8614 (S60).

Several embodiments of the present invention are described above, but they are merely examples illustrating the present invention, and the scope of the present invention is not limited to these embodiments. The present invention can be also carried out in a variety of other modes. For example, the Utility Program 715 may be in the NAS node 10 and may be in the primary storage system 600. Further, the file system management information (information shown by way of an example in FIG. 5) that is used by the NAS node 10 may be stored in the storage resources (for example, internal LDEV) located in the primary storage system 600. Furthermore, for example, the NAS node 10 and/or the management terminal 106 may be contained in the primary storage system 600. Furthermore, for example, when a plurality of files are duplicated in a virtual LDEV, but one or more certain files from among these plurality files are stored in an external LDEV and files other than the one or more certain files from among these plurality of files (referred to hereinbelow as "other files") are not stored in the external LDEV, the storage area in the external LDEV corresponding to the storage area in which the other files are present in the virtual LDEV becomes unoccupied storage area, and this unoccupied storage area may be also used (for example, any information may be stored in the unoccupied storage area).

What is claimed is:

1. A storage system comprising:
    a first storage system having one or more first logical storage devices where a plurality of files are stored, and
    a second storage system having one or more second logical storage devices,
    wherein said first storage system is configured to:
    a) determine whether two or more identical contents hash values are contained in a plurality of contents hash values of said plurality of files; and
    b) change an access destination of a first file corresponding to a first contents hash value from among said two or more identical contents hash values, to a position of a second file corresponding to a second contents hash value from among said two or more identical contents hash values, if there are said two or more identical contents hash values,
    c) do not migrate said first file to said second storage system, and migrate said second file to said second storage system to store in any of said one or more second logical storage devices.

2. A storage system according to the claim 1,
    wherein said first storage system performs a), b) and c) when said first storage system receives archive instruction to migrate said plurality of files.

3. A storage system according to the claim 1,
    wherein said first storage system is configured to manage a storage period limit associated to each of said plurality of files, and
    said first storage system is configured to change said access destination of said first file to said position of said second file whose storage period limit is longer than storage period limit of said first file.

4. A storage system according to the claim 1, wherein said first storage system further comprises:
    one or more virtual logical storage devices respectively associated with said one or more second logical storage devices in said second storage system;
    wherein said first storage system is configured to:
    write each file stored in said one or more first logical storage devices to said one or more second logical storage devices via said one or more virtual logical storage devices of a migration destination.

5. A storage system according to the claim 4,
    wherein before said migration is started, none of said one or more first logical storage devices that store said plurality of files can be updated, and after said migration is completed, each of said one or more virtual logical storage devices can be updated, but none of said plurality of files that have become the object of said migration can be updated.

6. A storage system according to claim 1, wherein said first storage system changes an access destination of said first file to said position of said second file, based on a device characteristic of said one or more second logical storage devices.

7. A processor-implemented storage method effected within a system including:
    at least one processor;
    a first storage system having one or more first logical storage devices where a plurality of files are stored, and
    a second storage system having one or more second logical storage devices,
    wherein said storage method effects, with respect to said first storage system, operations to:
    a) determine whether two or more identical contents hash values are contained in a plurality of contents hash values of said plurality of files; and b) change an access destination of a first file corresponding to a first contents hash value from among said two or more identical contents hash values, to a position of a second file corresponding to a second contents hash value from among said two or more identical contents hash values if there are said two or more identical contents hash values, c) do not migrate said first file to said second storage system, and migrate said second file to said second storage system to store in any of said one or more second logical storage devices.

8. A storage method according to the claim 7, wherein said storage method performs a), b) and c) when said first storage system receives archive instruction to migrate said plurality of files.

9. A storage method according to the claim 7, wherein said storage method is configured to manage a storage period limit associated to each of said plurality of files, and said storage method is configured to change said access destination of said first file to said position of said second file whose storage period limit is longer than storage period limit of said first file.

10. A storage method according to the claim 7, wherein said first storage system further comprises:

one or more virtual logical storage devices respectively associated with said one or more second logical storage devices in said second storage system;

wherein said storage method further effects operations to:

write each files stored in said one or more first logical storage devices to said one or more second logical storage devices via said one or more virtual logical storage devices of a migration destination.

11. A storage method according to the claim 10, wherein before said migration is started, none of said one or more first logical storage devices that store said plurality of files can be updated, and after said migration is completed, each of said one or more virtual logical storage devices can be updated, but none of said plurality of files that have become the object of said migration can be updated.

12. A storage method according to claim 7, wherein said first storage method changes an access destination of said first file to said position of said second file, based on a device characteristic of said one or more second logical storage devices.

* * * * *